(12) United States Patent
Ito et al.

(10) Patent No.: US 11,715,263 B2
(45) Date of Patent: Aug. 1, 2023

(54) FILE GENERATION APPARATUS, IMAGE GENERATION APPARATUS BASED ON FILE, FILE GENERATION METHOD AND STORAGE MEDIUM

(71) Applicant: CANON KABUSHIKI KAISHA, Tokyo (JP)

(72) Inventors: Hironao Ito, Tokyo (JP); Kazufumi Onuma, Tokyo (JP); Mitsuru Maeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/147,636

(22) Filed: Jan. 13, 2021

(65) Prior Publication Data

US 2021/0134058 A1   May 6, 2021

Related U.S. Application Data

(63) Continuation of application No. PCT/JP2019/019226, filed on May 15, 2019.

(30) Foreign Application Priority Data

Jul. 19, 2018   (JP) .................. 2018-136204

(51) Int. Cl.
*G06T 17/20* (2006.01)
*G06T 7/194* (2017.01)
*H04N 13/178* (2018.01)
*H04N 13/282* (2018.01)

(52) U.S. Cl.
CPC .............. *G06T 17/20* (2013.01); *G06T 7/194* (2017.01); *H04N 13/178* (2018.05); *H04N 13/282* (2018.05)

(58) Field of Classification Search
None
See application file for complete search history.

(56) References Cited

U.S. PATENT DOCUMENTS 5,812,787 A * 9/1998 Astle ...................... H04N 19/17
                                                 375/E7.263
2006/0007229 A1* 1/2006 Nonclercq ............ G06F 16/248
                                                 345/419

(Continued)

FOREIGN PATENT DOCUMENTS

JP      2011-015215 A    1/2011
JP      2012-010344 A    1/2012

(Continued)

OTHER PUBLICATIONS

Kauff et al., Data Format and Coding for Free Viewpoint Video, 2005, Fraunhofer Institute for Telecommunications (Year: 2005).*

(Continued)

*Primary Examiner* — Anh-Tuan V Nguyen
(74) *Attorney, Agent, or Firm* — Carter, DeLuca & Farrell LLP

(57) ABSTRACT

A file generation apparatus generates a file which includes material data used for generation of a virtual viewpoint image that is based on a multi-viewpoint image and type information for specifying a type of the material data, and outputs the generated file.

10 Claims, 20 Drawing Sheets

(56) References Cited

U.S. PATENT DOCUMENTS

| | | | |
|---|---|---|---|
| 2006/0028473 A1* | 2/2006 | Uyttendaele | G06T 15/205 345/473 |
| 2007/0160306 A1* | 7/2007 | Ahn | G06T 9/001 382/245 |
| 2008/0170696 A1* | 7/2008 | Yoshimura | G06F 21/57 380/277 |
| 2009/0079728 A1* | 3/2009 | Sugita | G06T 15/20 345/418 |
| 2009/0208125 A1* | 8/2009 | Kajiwara | H04N 1/41 382/243 |
| 2009/0219282 A1* | 9/2009 | Kim | H04N 19/50 345/419 |
| 2009/0295907 A1* | 12/2009 | Kim | H04N 19/597 348/E13.001 |
| 2011/0219098 A1* | 9/2011 | Xu | H04L 67/06 709/219 |
| 2011/0254841 A1* | 10/2011 | Lim | G06T 17/20 345/421 |
| 2012/0133736 A1* | 5/2012 | Nishi | H04N 19/70 348/43 |
| 2012/0229449 A1* | 9/2012 | Psistakis | G11B 27/11 345/419 |
| 2015/0178988 A1* | 6/2015 | Montserrat Mora | G06T 13/40 345/420 |
| 2017/0064279 A1* | 3/2017 | Chien | H04N 13/128 |
| 2017/0142174 A1* | 5/2017 | Yamagishi | H04L 69/22 |
| 2017/0255428 A1* | 9/2017 | Suzuki | H04N 1/00458 |
| 2017/0286993 A1* | 10/2017 | Khalid | G06Q 30/0241 |
| 2018/0152688 A1* | 5/2018 | Graziosi | G06T 15/04 |
| 2018/0205963 A1* | 7/2018 | Matei | H04N 21/85406 |
| 2018/0286626 A1* | 10/2018 | Santo | H01J 37/244 |
| 2018/0316903 A1* | 11/2018 | Katsumata | H04N 21/2353 |
| 2019/0075332 A1 | 3/2019 | Onuma | |
| 2019/0131081 A1* | 5/2019 | Li | H05B 47/19 |
| 2019/0246089 A1 | 8/2019 | Maeda | |
| 2019/0318488 A1* | 10/2019 | Lim | H04N 21/8547 |
| 2020/0245003 A1 | 7/2020 | Onuma | |
| 2021/0142551 A1* | 5/2021 | Kobayashi | G06T 15/04 |

FOREIGN PATENT DOCUMENTS

| | | |
|---|---|---|
| JP | 2014-215828 A | 11/2014 |
| JP | 2017-211828 A | 11/2017 |
| WO | 2017204172 A1 | 11/2017 |

OTHER PUBLICATIONS

International Search Report issued in International Application No. PCT/JP2019/019226 dated Jul. 2, 2019, pp. 1.

Extended European Search Report issued by the European Patent Office dated Apr. 4, 2022 in corresponding EP Patent Application No. 19837969.5.

Office Action issued by the European Patent Office dated Mar. 24, 2023 in corresponding EP Patent Application No. 19837969.5.

Anonymous: "Information Technology—Coding of audio-visual objects-Part 15: Advances Video Coding (AVC) file format, Amendment 3: File format Support for Multiview Video Coding" ISO/IEC 14496-15:2004/FPDAM 3 (Feb. 2009) pp. 1-47, XP030016933, http://phenix.int-evry.fr/mpeg/doc_end_user/documents/87_Lausanne/wg11/w10445.zip w10445-mvc-ff-fpdam.doc.

* cited by examiner

FIG.1

| Tag Name | Field Name | Type | Count |
|---|---|---|---|
| version of CI tag | CI Version ID | BYTE | 4 |
| camera ID | Camera ID | LONG | 1 |
| format | format | LONG | 1 |
| width of image | Image width | LONG | 1 |
| height of image | Image height | LONG | 1 |
| bit depth | Bit Depth | LONG | 1 |

FIG.4A

| Tag Name | Field Name | Type | Count |
|---|---|---|---|
| version of CP tag | CP Version ID | BYTE | 4 |
| camera ID | Camera ID | LONG | 1 |
| stored camera parameter | Stored Camera Parameter | LONG | 1 |
| orientation parameter | RotationQuaternion | SLONG | 4 |
| position parameter | Translation Vector | FLOAT | 3 |
| viewing angle parameter | Horizontal Angle | FLOAT | 1 |
| distance to image capturing target | Distance to Target | LONG | 1 |
| focal length | Focal Length | RATIONAL | 1 |
| width of image | Image Width | LONG | 1 |
| height of image | Image Length | LONG | 1 |
| aperture value | Aperture Value | RATIONAL | 1 |
| shutter speed | Shutter Speed Value | SRATIONAL | 1 |
| ISO speed rate | ISO Speed Ratings | SHORT | 1 |

FIG.4B

| bit | Data Name |
|---|---|
| 0 | orientation parameter |
| 1 | position parameter |
| 2 | viewing angle parameter |
| 3 | distance to image capturing target |
| 4 | focal length |
| 5 | background 3D model |
| 6 | width of image |
| 7 | height of image |
| 8 | aperture value |
| 9 | shutter speed |
| 10 | ISO speed rate |
| 11~31 | reserved |

FIG.4C

| Data Name | Field Name | Type | Count |
|---|---|---|---|
| version of B3M tag | B3M Version ID | BYTE | 4 |
| stored background 3D model information | Stored Background 3D Model Info | LONG | 1 |
| point cloud format | Point Cloud Format | LONG | 1 |
| mesh model format | Mesh Model Format Texture | LONG | 1 |
| corresponding coordinates of texture | Corresponding coordinates of | LONG | 1 |
| download URL | Download URL | LONG | 1 |

FIG.4D

| bit | Data Name |
|---|---|
| 0 | point cloud model |
| 1 | mesh model |
| 2 | corresponding coordinates of texture |
| 3 | download URL |
| 4~31 | reserved |

Box Type:    'cimg'
Container:   Meta box ( 'meta' )
Mandatory:   No
Quantity:    Zero or one

FIG.7B

```
aligned(8) class ItemLocationBox extends FullBox('cimg',version,0) {
    unsigned int(32) offset_size;
    unsigned int(32) length_size;
    unsigned int(32) base_offset_size;
    if (version == 1) {
        unsigned int(32) index_size;
    } else {
        unsigned int(32) reserved;
    }
    unsigned int(32) camera_id;            //camera ID
    unsigned int(32) Format; //format
    unsigned int(32) Image_Width;          //width of image
    unsigned int(32) Image_Length;         //height of image
    unsigned int(32) bit Depth             //bit depth
}
```

FIG.8A

Box Type: 'camp'
Container: Meta box ( 'meta' )
Mandatory: No
Quantity: Zero or one

FIG.8B

```
aligned(8) class ItemLocationBox extends FullBox('camp',version,0) {
    unsigned int(32) offset_size;
    unsigned int(32) length_size;
    unsigned int(32) base_offset_size;
    if (version == 1) {
        unsigned int(32) index_size;
    } else {
        unsigned int(32) reserved;
    }
    unsigned int(32) camera_id;                //camera ID
    unsigned int(32) stored_camera_parameter;  //stored camera parameter
    for (i=0, i<4; i++) {
        int(32) Rotetion_Quaternion[i];//orientation parameter
    }
    for (i=0, i<3; i++) {
        float(32) Translation_Vector[i];      //position parameter
    }
    float(32) Horizontal_Angle;                //viewing angle parameter
    unsigned int(32) Distance_to_Target;  //distance to image capturing target
    unsigned int(32) Focal_Length_Numerator    //focal length  numerator
    unsigned int(32) Focal_Length_Denominator  //focal length  denominator
    unsigned int(32) Image_Width;       //width of image
    unsigned int(32) Image_Length;      //height of image
    unsigned int(32) Aperture_Value_Numerator         //aperture value numerator
    unsigned int(32) Aperture_Value_Denominator //aperture value denominator
    int(32) Shutter_Speed_Numerator//shutter speed  numerator
    int(32) Shutter_Speed_Denominator   //shutter speed  denominator
    short(16) ISO_Speed_Rating          //ISO sensitivity
}
```

FIG.9A

Box Type: 'fimg'
Container: Meta box ('meta')
Mandatory: No
Quantity: Zero or one

FIG.9B

```
aligned(8) class ItemLocationBox extends FullBox('fimg',version,0) {
    unsigned int(32) offset_size;
    unsigned int(32) length_size;
    unsigned int(32) base_offset_size;
    if (version == 1) {
        unsigned int(32) index_size;
    } else {
        unsigned int(32) reserved;
    }
    unsigned int(32) Stored Foreground Image Info   //stored foreground information
    unsigned int(32) Foreground Format              //foreground format ~901
    unsigned int(32) Foreground Silhouette Format   //foreground silhouette ~902
    unsigned int(32) Trimming Foreground Format     //trimming foreground format ~903
}
```

FIG. 10A

Box Type: 'bimg'
Container: Meta box ('meta')
Mandatory: No
Quantity: Zero or one

FIG. 10B

```
aligned(8) class ItemLocationBox extends FullBox('bimg',version,0) {
    unsigned int(32) offset_size;
    unsigned int(32) length_size;
    unsigned int(32) base_offset_size;
    if (version == 1) {
        unsigned int(32) index_size;
    } else {
        unsigned int(32) reserved;
    }
    unsigned int(32) Stored Background Image Info   //stored background information ~1001
    unsigned int(32) Background Format              //background format ~1002
    unsigned int(32) Background Texture Format      //background texture format
    unsigned int(32) Trimming Background Format     //trimming background format ~1003
}
```

FIG. 11A

Box Type: 'fmdl'
Container: Meta box ('meta')
Mandatory: No
Quantity: Zero or one

FIG. 11B

```
aligned(8) class ItemLocationBox extends FullBox('fmdl',version,0) {
    unsigned int(32) offset_size;
    unsigned int(32) length_size;
    unsigned int(32) base_offset_size;
    if (version == 1) {
        unsigned int(32) index_size;
    } else {
        unsigned int(32) reserved;
    }
    unsigned int(32) Stored Foreground 3D Model Info   //stored foreground 3D model information
    unsigned int(32) Point Cloud Format   //point cloud format
    unsigned int(32) Mesh Model Format   //mesh model format
    unsigned int(32) Billboard Format   //billboard format
    unsigned int(32) Bounding Box Format   //bounding box form
```

FIG.12A

Box Type: 'bmdl'
Container: Meta box ('meta')
Mandatory: No
Quantity: Zero or one

FIG.12B

```
aligned(8) class ItemLocationBox extends FullBox('bmdl', version, 0) {
    unsigned int(32) offset_size;
    unsigned int(32) length_size;
    unsigned int(32) base_offset_size;
    if (version == 1) {
        unsigned int(32) index_size;
    } else {
        unsigned int(32) reserved;
    }
    unsigned int(32) Stored Background 3D Model Info  //stored background 3D model information
    unsigned int(32) Point Cloud Format   //point cloud format ~1201
    unsigned int(32) Mesh Model Format    //mesh model format ~1202
    unsigned int(32) Correspoinding Cordinates Of Texture //correspoinding coordinates of texture
    unsigned int(32) Download URL //download URL
}
```

| Tag Name | Field Name | Type | Count |
|---|---|---|---|
| version of FI tag | FI Version ID | BYTE | 4 |
| stored foreground information | Stored Forground Info | LONG | 1 |
| foreground format | Foreground Format | LONG | 1 |
| foreground silhouette format | Foreground Silhouette Format | LONG | 1 |
| trimming foreground format | Trimming Foreground Format | LONG | 1 |

FIG.16A

| bit | Data Name |
|---|---|
| 0 | foreground image |
| 1 | foreground silhouette image |
| 2 | foreground trimming image |
| 3~31 | reserved |

FIG.16B

| Tag Name | Field Name | Type | Count |
|---|---|---|---|
| version of BI tag | BI Version ID | BYTE | 4 |
| stored background information | Stored Background Info | LONG | 1 |
| background format | Background Format | LONG | 1 |
| background texture format | Background Texture Format | LONG | 1 |
| trimming background format | Trimming Background Format | LONG | 1 |

FIG.16C

| bit | Data Name |
|---|---|
| 0 | background image |
| 1 | background texture |
| 2 | background trimming image |
| 3~31 | reserved |

FIG.16D

| Tag Name | Field Name | Type | Count |
|---|---|---|---|
| version of F3M tag | F3MI Version ID | BYTE | 4 |
| stored foreground 3D model information | Stored Foreground 3D Model Info | LONG | 1 |
| point cloud format | Point Cloud Format | LONG | 1 |
| mesh model format | Mesh Model Format | LONG | 1 |
| billboard format | Billboard Format | LONG | 1 |
| bounding box format | Bounding Box Format | LONG | 1 |

FIG.16E

| bit | Data Name |
|---|---|
| 0 | point cloud model |
| 1 | mesh model |
| 2 | billboard model |
| 3 | bounding box |
| 4~31 | reserved |

FIG.16F

FILE GENERATION APPARATUS, IMAGE GENERATION APPARATUS BASED ON FILE, FILE GENERATION METHOD AND STORAGE MEDIUM

CROSS-REFERENCE TO RELATED APPLICATIONS

This application is a Continuation of International Patent Application No. PCT/JP2019/019226, filed May 15, 2019, which claims the benefit of Japanese Patent Application No. 2018-136204, filed Jul. 19, 2018, both of which are hereby incorporated by reference herein in their entirety.

BACKGROUND

Field

The present disclosure relates to generation of a file of a virtual viewpoint image and handling thereof.

Background Art

As a technique to reproduce a video image viewed from an arbitrary virtual viewpoint specified by a user from a multi-viewpoint video (image) obtained by capturing an object from multiple directions using a plurality of cameras, there is a virtual viewpoint video (image) generation technique. For generation of a virtual viewpoint image, a variety of video materials are used, such as a multi-viewpoint image, a foreground image, a foreground silhouette image, a foreground 3D model, a camera parameter, a background image, and a background 3D model. These video materials are accumulated in a database after they are generated and appropriate material data is acquired from the database based on a virtual viewpoint specified by a user, and a virtual viewpoint image is generated (see Patent Literature 1).

CITATION LIST

Patent Literature

Patent Literature 1: Japanese Patent Laid-Open No. 2017-211828

SUMMARY

However, it is difficult for an apparatus not capable of interpreting the format of material data stored in the database to reproduce a virtual viewpoint image based on the material data.

For example, in a case where the original of the format of material data stored in the database is defined for each apparatus that generates each material and the acquisition method thereof is different depending on the material, it is difficult for a terminal (for example, a smartphone and the like) having spread widely in the world to generate a virtual viewpoint image.

The present disclosure has been made in view of the above-described problem and an object is to make it possible for more apparatuses to generate a virtual viewpoint image.

The file generation apparatus according to the present disclosure includes: one or more memories storing instructions: one or more processors executing the instructions to: acquire material data used for generation of a virtual viewpoint image that is based on images captured from a plurality of viewpoints; generate a file including the material data and type information indicating a type of the material data; and output the generated file.

According to the present disclosure, it is made possible for more apparatuses to generate a virtual viewpoint image.

Further features of the present disclosure will become apparent from the following description of exemplary embodiments with reference to the attached drawings.

BRIEF DESCRIPTION OF THE DRAWINGS

FIG. 1 is a function block diagram of a file generation apparatus according to a first embodiment;

FIG. 4A is a diagram showing an example of metadata of a captured image of each camera, FIG. 4B is an example of metadata of camera parameters, FIG. 4C is a diagram showing bit assignment thereof, FIG. 4D is an example of metadata of a background 3D model, and FIG. 4F, is a diagram showing bit assignment thereof.

FIG. 7A is an example of a cimg box and FIG. 7B is a diagram showing syntax thereof;

FIG. 8A is an example of a camp box and FIG. 8B is a diagram showing syntax thereof;

FIG. 9A is an example of a fimg box and FIG. 9B is a diagram showing syntax thereof;

FIG. 10A is an example of a bimg box and FIG. 10B is a diagram showing syntax thereof;

FIG. 11A is an example of a fmdl box and FIG. 11B is a diagram showing syntax thereof;

FIG. 12A is an example of a bmdl box and FIG. 12B is a diagram showing syntax thereof;

FIG. 16A, FIG. 16C, and FIG. 16E are each a diagram showing an example of metadata and FIG. 16B, FIG. 16D, and FIG. 16F are each a diagram showing bit assignment thereof;

DESCRIPTION OF THE EMBODIMENTS

Figure 2:
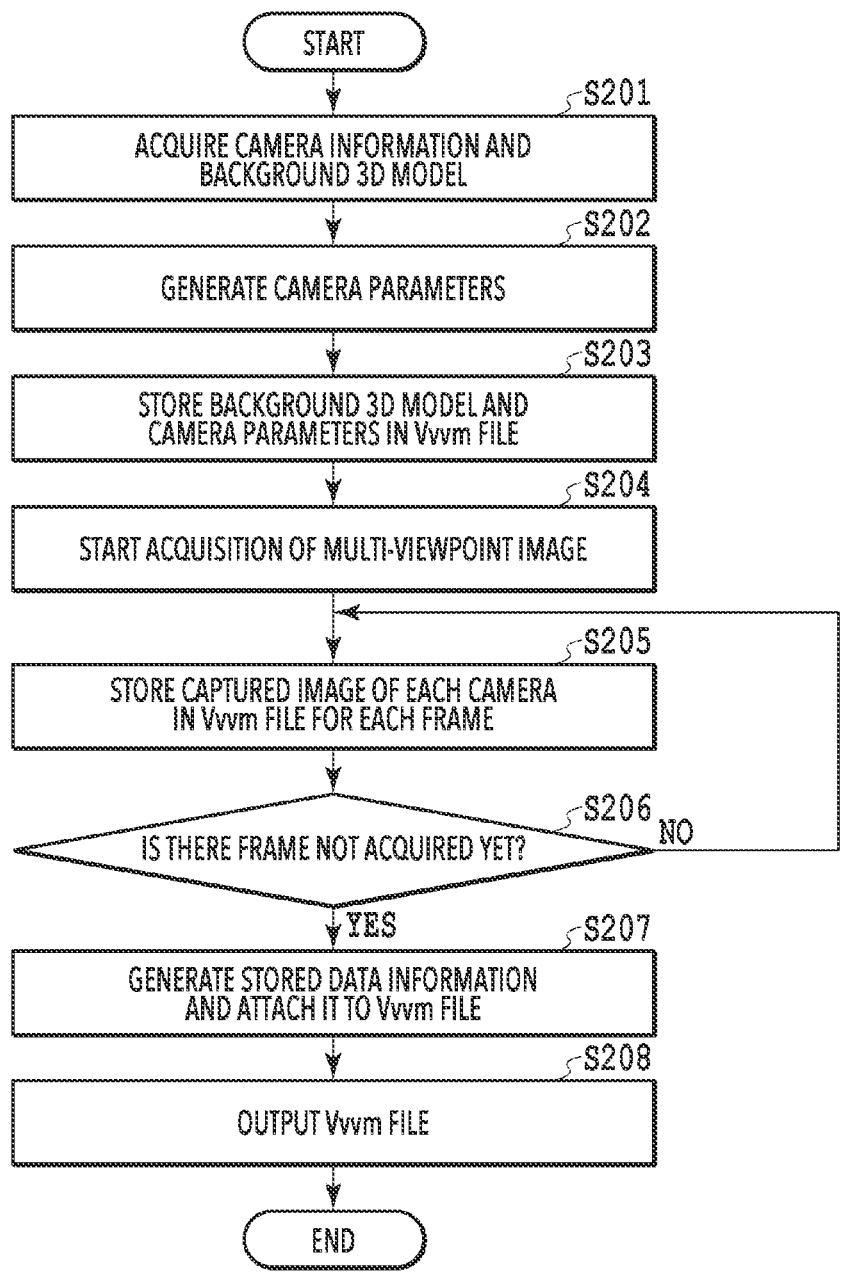
FIG. 2 is a flowchart showing a flow of Vvvm file generation processing according to the first embodiment.

In the following, embodiments of the present disclosure are explained with reference to the drawings. The following embodiments are not intended to limit the present disclosure and all combinations of features explained in the present embodiments are not necessarily indispensable to the solution of the present disclosure.

First Embodiment

A virtual viewpoint image generation system of the present embodiment includes a file generation apparatus that generates a file including material data of a virtual viewpoint image and a virtual viewpoint image generation apparatus that generates a virtual viewpoint image by using the file. In the present specification, a file including material data of a virtual viewpoint video (image) is called "Vvvm file". The virtual viewpoint image is a video image that is generated by an end user and/or an appointed operator or the like freely operating the position and orientation of a virtual camera and also called a free-viewpoint image, an arbitrary-viewpoint image and the like. Further, the virtual viewpoint image may be a moving image (video) or a still image. In the following, an example in a case where the virtual viewpoint image is a moving image is explained mainly.

The file generation apparatus generates a Vvvm file storing material data necessary for generation of a virtual viewpoint image, such as a multi-viewpoint image and camera parameters. At this time, to the Vvvm file, stored data information, which is information specifying stored material data, is attached. The virtual viewpoint image generation apparatus generates a virtual viewpoint image by using the material data within the Vvvm file in a case where it is known that generation of a virtual viewpoint image is possible in the own apparatus based on the stored data information included in the Vvvm file.

(File Generation Apparatus)

Figure 1:
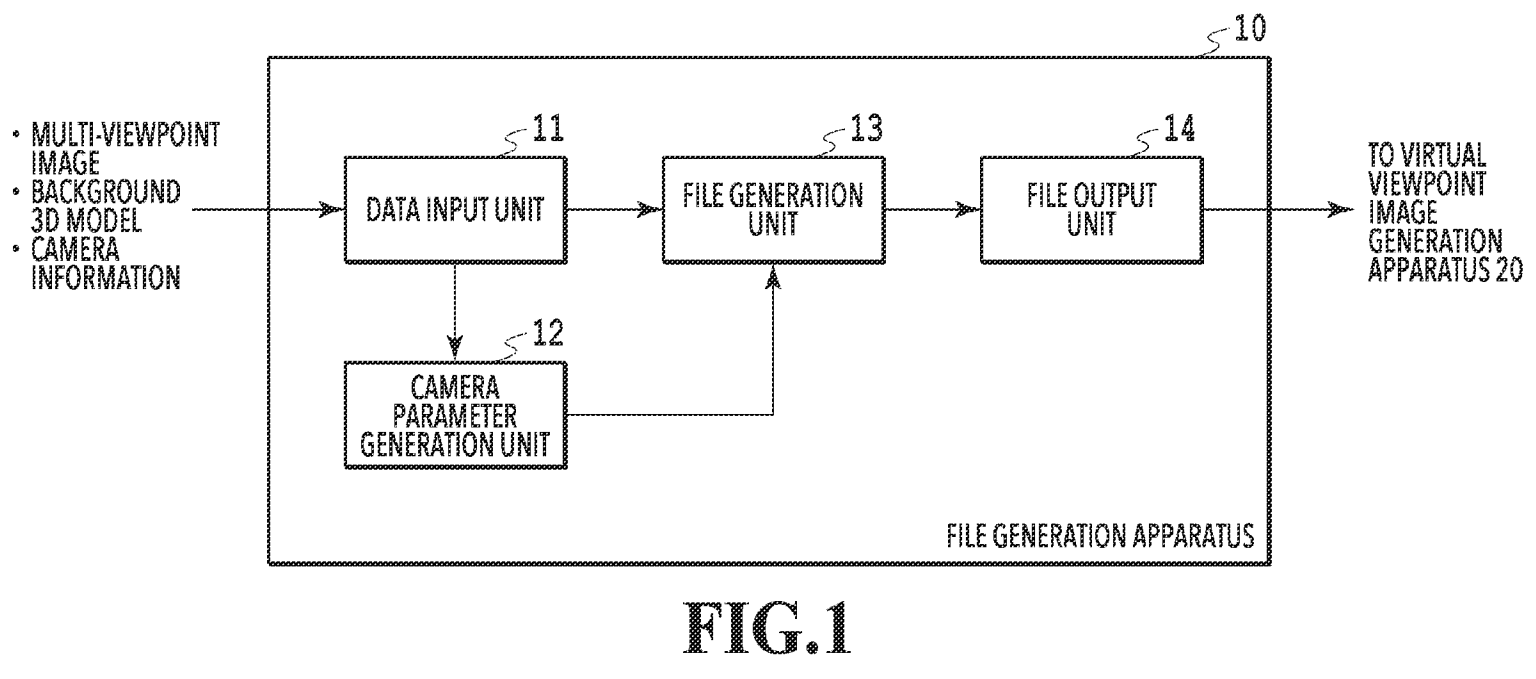

FIG. 1 is a function block diagram of a file generation apparatus 10 according to the present embodiment. The file generation apparatus 10 includes a data input unit 11, a camera parameter generation unit 12, a file generation unit 13, and a file output unit 14. The file generation apparatus 10 is an information processing apparatus comprising hardware for computation and data storage, such as a CPU, a RAM, a ROM, and an HDD, and for example, is a PC. The function of each unit shown in FIG. 1 is implemented by the CPU reading a predetermined program from the ROM or the HDD and loading the program onto the RAM and executing the program and so on. In the following, the role of each unit shown in FIG. 1 is explained.

The data input unit 11 receives an input of various kinds of material data stored in a Vvvm file or data that is the source of the material data via an external interface (not shown schematically). In a case of the present embodiment, camera information relating to a plurality of cameras installed in an image capturing scene, a multi-viewpoint image captured by the plurality of cameras, and data of a background 3D model representing a three-dimensional shape of a facility (background object), such as a stadium, are input from an external apparatus. For example, the camera information is input from the PC that performs calibration of each camera, the multi-viewpoint image data is input from the plurality of cameras, and data of the background 3D model is input from the PC that generates the data, respectively. In the camera information, information on the position, the orientation (line-of-sight direction), and the viewing angle of each camera is included. In a case where the number of cameras or the position, the orientation, or the viewing angle of each camera is changed on the way of image capturing, the camera information is acquired again. Further, the captured image of each camera, which configures a multi-viewpoint image, is associated with a camera. ID attached to each camera, and therefore, it is possible to determine by which camera an image has been captured. The input camera information is sent to the camera parameter generation unit 12 and each piece of the data of the multi-viewpoint image and the background 3D model is sent to the file generation unit 13.

The camera parameter generation unit 12 generates camera parameters for each camera group including a plurality of cameras facing a common gaze point based on the camera information received from the data input unit 11. The camera parameters include at least information on the number of cameras configuring each camera group and information on the position, the orientation, and the viewing angle of each camera, which is associated with the ID of each camera (identification number of camera and the like). In addition to those, it may also be possible to include information on the shutter speed, the aperture value, the ISO sensitivity, the color temperature, the focal length of a lens, the distance to an image capturing target and the like. The generated camera parameters are sent to the file generation unit 13.

The file generation unit 13 integrates the data of the multi-viewpoint image and the background 3D model received from the data input unit 11 and the camera parameters received from the camera parameter generation unit 12 into one file in the common format. Then, the above-described Vvvm file is generated by generating stored data information indicating that the camera parameters, the background 3D model, and the multi-viewpoint image are stored as the material data and storing this information together with the material data in the file. In a case where the position, the orientation, the viewing angle or the like of one or a plurality of cameras is changed on the way of image capturing, the changed contents are attached to the camera parameters together with time information and stored within the Vvvm file. By doing so, also in a case where the position, the orientation, the viewing angle or the like of the camera having captured the stored multi-viewpoint image is changed on the way, it is made possible to grasp the fact and the contents from the camera parameters within the Vvvm file. Further, at the time of generating the above-described file, it may also be possible to divide the Vvvm file into a plurality of Vvvm files by taking into consideration, for example, the capacity limit or the like at the time of file transfer. In a case where the file generation by division such as this is performed, processing to associate the plurality of divided files, which should be one file originally, with one another is also performed.

The file output unit 14 outputs the Vvvm file generated by the file generation unit 13 to various apparatuses capable of generating a virtual viewpoint image. As the output aspect, for example, wired transmission to a PC, wireless transmission to a mobile terminal, such as a smartphone and a tablet, upload to a server via a network, storage in a mobile storage medium and the like are considered.

The above is the explanation of each unit in charge of the main functions of the file generation apparatus 10.

(Generation of Vvvm File)

Following the above, a flow of processing to generate a Vvvm file in the file generation apparatus 10 is explained.

FIG. 2 is a flowchart showing a flow of the Vvvm file generation processing according to the present embodiment. Symbol "S" at the top of each piece of processing means a step.

At S201, the data input unit 11 receives data of a background 3D model and information on each camera that performs image capturing from an external PC or the like. The received data of the background 3D model is sent to the file generation unit 13 and the received camera information is sent to the camera parameter generation unit 12. At S202 that follows, the camera parameter generation unit 12 generates the above-described camera parameters based on the camera information received from the data input unit 11. The generated camera parameters are sent to the file generation unit 13.

At S203, the file generation unit 13 stores the background 3D model received from the data input unit 11 and the camera parameters received from the camera parameter generation unit 12 in the Vvvm file.

At S204, the data input unit 11 starts acquisition of a multi-viewpoint image. For example, an image capturing start signal is transmitted to a plurality of cameras connected by a daisy chain method or the like and in response to this, the data of a captured image of each camera is received sequentially for each frame. The source that transmits the image capturing start signal may be the file generation apparatus 10 or another apparatus. The acquired multi-viewpoint image data is sent to the file generation unit 13 sequentially.

At S205, the file generation unit 13 stores the multi-viewpoint image data received from the data input unit 11 within the Vvvm file. For example, storage is performed for each frame and the data is stored so that it is possible to identify by which camera each captured image configuring the multi-viewpoint image has been captured.

At S206, the data input unit 11 determines whether or not the acquisition of the multi-viewpoint image has been completed. For example, an image capturing stop signal is transmitted to the plurality of cameras performing image capturing and in a case where the reception of data corresponding to all the captured frames is completed, it is determined that the acquisition of the multi-viewpoint image is completed and the processing advances to S207. On the other hand, in a case where image capturing is still in operation and there is frame data not received yet, the processing returns to S205 and the acquisition of the multi-viewpoint image and storage into the Vvvm file are continued.

At S207, the file generation unit 13 generates stored data information indicating the contents of the material data stored in the Vvvm file and adds the information to the Vvvm file. The completed Vvvm file is sent to the file output unit 14.

Then, at S208, the file output unit 14 outputs the Vvvm file to a virtual viewpoint image generation apparatus 20 as an output destination that is specified by a user or the like.

The above is the flow of the Vvvm file generation processing in the file generation apparatus 10. In the flow in FIG. 2, the file generation unit 13 integrates the Vvvm files into one Vvvm file after the acquisition processing of all the frame data is completed, but this is not limited. For example, it may also be possible to sequentially output a file generated for each frame and integrate the files into one file at the output destination external apparatus.

(Data Structure of Vvvm File)

Figure 3B:
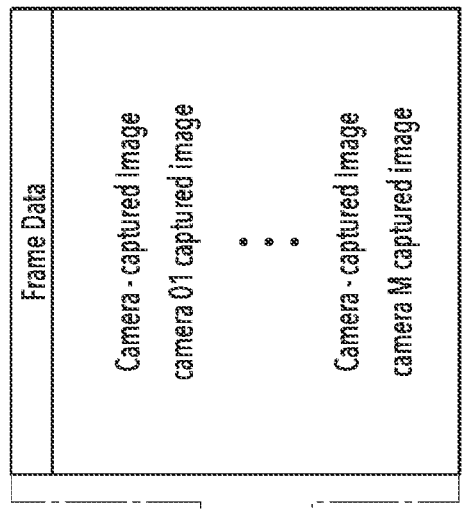
FIG. 3A is a diagram showing an example of a data structure of a Vvvm file and FIG. 3B is a diagram showing an example of bit assignment of stored data information.
Figure 3A:
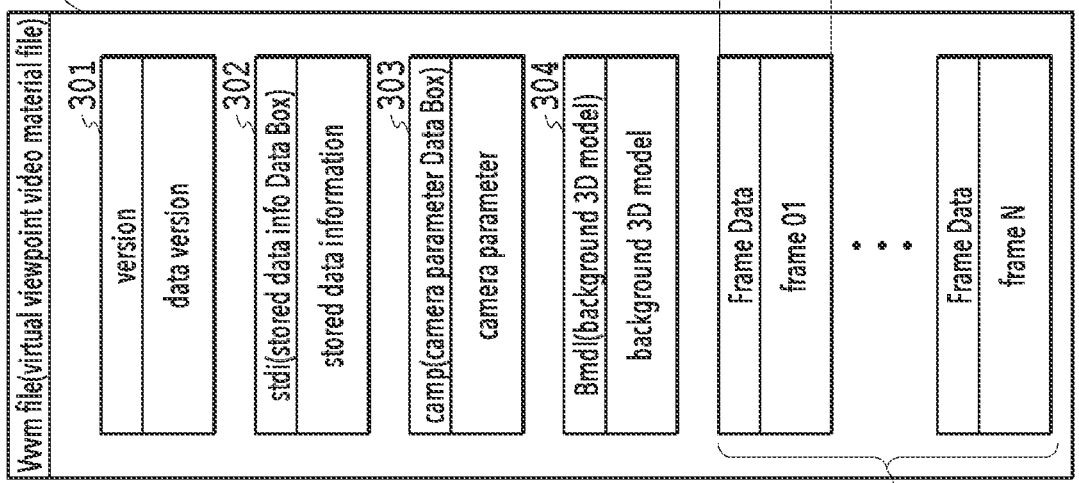

FIG. 3A is a diagram showing an example of a data structure of a Vvvm file according to the present embodiment. A Vvvm file 300 shown in FIG. 3A includes data version 301, stored data information 302, camera parameter 303, background 3D model 304, and frame data 305. In the frame data 305, first frame to Nth frame exist and in one frame data, captured images by M cameras are included. In this case, N and M are each a natural number not less than 1.

What kind of material data is stored in the Vvvm file 300 is indicated by the stored data information 302. FIG. 3B shows an example of bit assignment of the stored data information 302. Here, the stored data information 302 has 32-bit values and each bit indicates that the target data is stored in a case where the bit is "1" and that the target data is not stored in a case where the bit is "0". In the Vvvm file 300 shown in FIG. 3A, three kinds of material data, that is, the captured image (multi-viewpoint image) of each camera, the camera parameter, and the background 3D model are stored. In this case, each bit of b0, b1, and b5 is "1" and the other bits are "0". It is possible to define b10 to b13 arbitrarily. For example, it may also be possible to add an image whose format is the same as that of the foreground image and whose each pixel value indicates a distance from the camera to an object, with data name being changed to depth map or distance image. Further, it may also be possible to add data for increasing the speed of generation of a virtual viewpoint image or data for improving image quality.

Further, to each piece of material data that is stored, ancillary information (metadata) is attached, which indicates what kind of data the material data is. FIG. 4A shows an example of metadata of the captured image of each camera. FIG. 4B shows an example of metadata of the camera parameters and FIG. 4C shows bit assignment of the stored camera parameters, FIG. 4D shows an example of metadata of the background 3D model and FIG. 4E shows bit assignment of the stored background 3D model. In the top (first four bytes) of the camera parameter 303, information indicating the number of installed cameras is included and following the information on the number of installed cameras, the metadata relating to the camera parameters follows the number of times corresponding to the number of cameras.

As above, a variety of kinds of material data necessary for generation of a multi-viewpoint image are defined in the common format and filed en bloc. It may also be possible for one Vvvm file to include only the one camera parameter 303, but it may also be possible to have the camera parameter 303 for each frame. By having the camera parameter 303 for each frame, it is possible to deal also with a case where the position or the orientation of the camera changes on the way of image capturing or a case where the number of cameras configuring the camera group changes because of a failure of part of the cameras.

(Specific Example of Vvvm File)

Figure 5A:
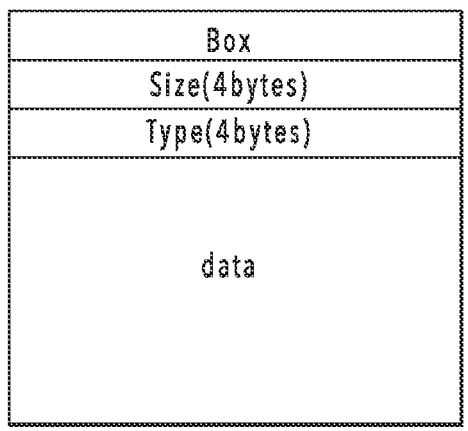
FIG. 5A and FIG. 5B are each a diagram showing an example of a box structure.
Figure 5B:
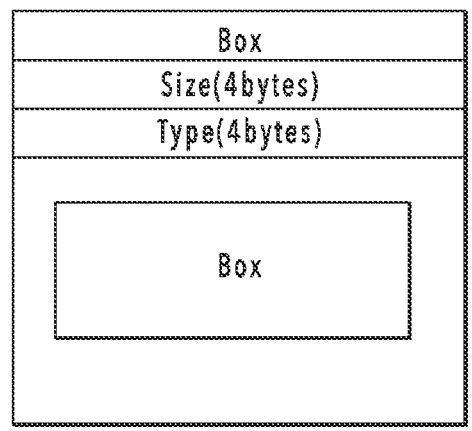

Following the above, a specific example of the Vvvm file of the present embodiment is explained, which is in conformity to the ISO MIFF (ISO Base Media File Format ISO/IEC 14496-12 MPEG-4 Part 12) standard. In the ISO BMFF standard, a file is configured in units of "boxes". FIG. 5A is a diagram showing the structure of the box and the box includes an area storing size information, an area storing type information, and an area storing data. Further, as shown in FIG. 5B, it is also possible for the box to further include another box as data.

Figure 6:
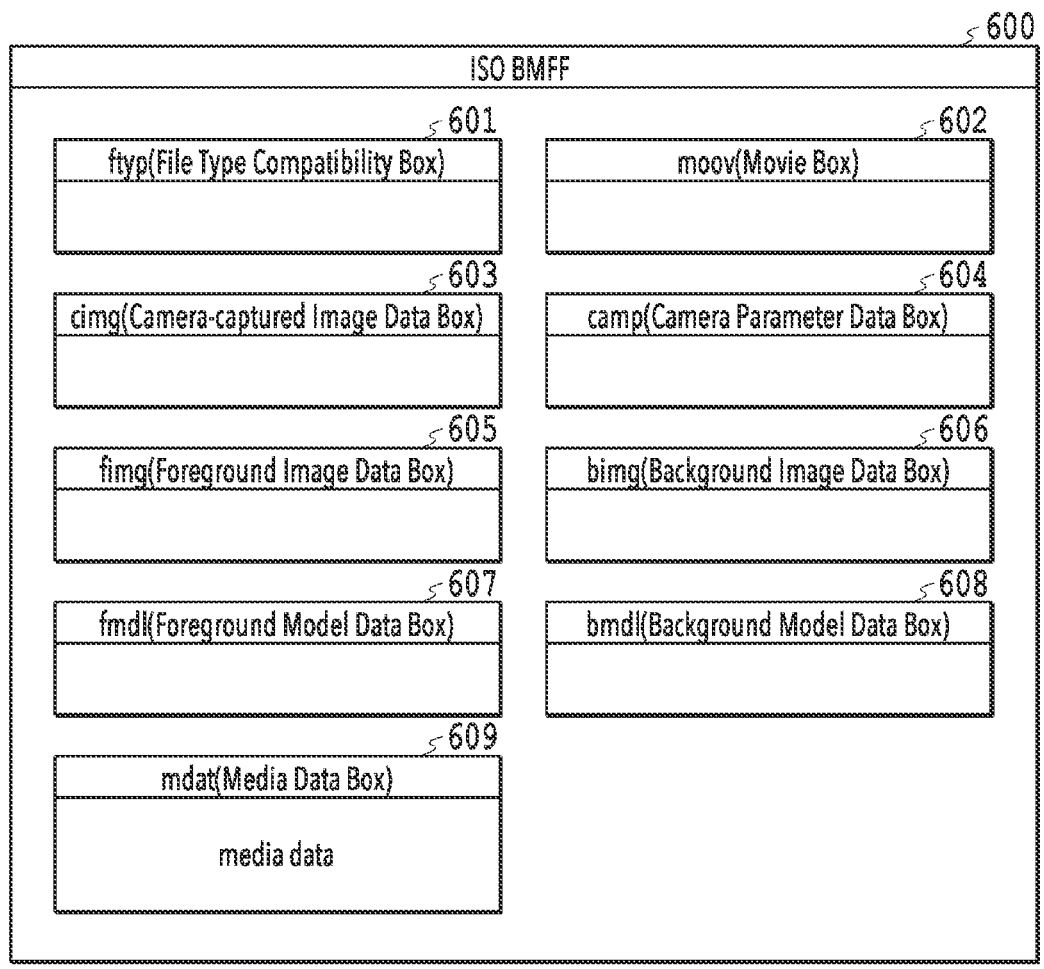
FIG. 6 is a diagram showing an example of a Vvvm file.

FIG. 6 shows an example of an internal structure of a Vvvm file in conformity to the ISO BMFF. A Vvvm file 600 in conformity to the ISO BMFF includes each box of ftyp 601, moov 602, cimg 603, camp 604, fimg 605, bimg 606, fmdl 607, bmdl 608, and mdat 609. In the following, each box is explained.

The ftyp box (File Type Compatibility Box) 601 is a box that is arranged first within the file. In the ftyp box 601, information on the file format, information indicating the version of the box, information relating to the compatibility with another file format, information on the name of the maker having created the file, and the like are described. The above-described stored data information 302 indicating the type of each piece of material data, which is stored within the Vvvm file, may be stored in this ftyp box 601. Further, the moov (Movie Box) 602 is a box that makes clear how what kind of data is stored within the file and information on the time axis, the address and the like for managing media data is input. Then, in the mdat box (Media Data Box) 609, media data (material data), such as a moving image and voice, which is used at the time of generating a virtual viewpoint image is input. By describing how the data is stored in the mdat box 609 in the moov box 602, it is made possible to access the media data. The ftyp box 601, the moov box 602, and the mdat box 609 are boxes that are provided in common in a file in conformity to the ISO BMFF. In contrast to this, each box of the camp 604, the fimg 605, the bimg 606, the fmdl 607, and the bmdl 609 is a box unique to the Vvvm file, in the following, the boxes unique to the Vvvm file are explained by taking a specific example.

In the cimg box (Camera-captured Image Data Box) 603, format information on the captured image of each camera, which can be set for each camera, is input. FIG. 7A is an example of the cimg box 603 and FIG. 7B is syntax thereof.

In the camp box (Camera Parameter Data Box) 604, information indicating what kind of data is stored as the camera parameter and each value of the camera parameter corresponding thereto, which can be set for each camera, are input. FIG. 8A is an example of the camp box 604 and FIG. 8B is syntax thereof.

In the fimg box (Foreground Image Data Box) 605, information indicating what kind of image data is stored as the foreground image and format information on each foreground image are input. FIG. 9A is an example of the fimg box 605 and FIG. 9B is syntax thereof. "foreground format" 901 indicates the save format of the foreground image, such as RAW, LOG, RGB, and YUV, and the bit depth. "foreground silhouette format" 902 indicates the bit depth of the foreground silhouette image and for example, is capable of indicating whether the 1-bit foreground or background and representing the accuracy as the foreground silhouette in eight bits. "trimming foreground format" 903 indicates information similar to that of "foreground format" 901.

In the bimg box (Background Image Data. Box) 606, information indicating what kind of image data is stored as the background image and format information on each background image are input. FIG. 10A is an example of the bimg box 606 and FIG. 10B is syntax thereof. "background format" 1001 indicates information on the save format of the background image and the bit depth, like "foreground format" 901 described above. "background texture format" 1002 indicates the number of vertex coordinates of the corresponding background 3D model, in addition to the information on the save format and the bit depth thereof. "trimming background format" 1003 indicates information similar to that of "background format" 1001.

In the fmdl box (Foreground Model Data. Box) 607, information indicating what kind of data is stored as the foreground 3D model and format information on each foreground 3D model are input. FIG. 11A is an example of the fmdl box 607 and FIG. 11B is syntax thereof. "point cloud format" 1101 indicates by how many millimeters each point represents the coordinates of the voxel. "mesh model format" 1102 indicates the number of vertexes of the mesh and the like. "billboard format" 1103 indicates the unit of the coordinates on which the billboard is placed. "bounding box format" 1104 indicates the representation format, such as whether the bounding box is indicated by two representative vertexes or whether the bounding box is indicated by one representative vertex, the width, the depth, and the height.

In the bmdl box (Background Model Data Box) 608, information indicating what kind of data is stored as the background 3D model and format information on each background 3D model are input. FIG. 12A is an example of the bmdl box 608 and FIG. 12B is syntax thereof. "point cloud format" 1201 and "mesh model format" 1202 indicate information relating to the above-described foreground 3D model, which is similar to that of "point cloud format" 1101 and "mesh model format" 1102.

In the present embodiment, the ISO BMFF standard is explained as an example, but the format of the Vvvm file is not limited to this. For example, the format may be in conformity to another standard, for example, such as HEIF (High Efficiency Image File Format) and MiAF (Multi-Image Application Format) compatible with the ISO BMFF. Alternatively, the format may be a unique format or a new format that will appear in the future. Further, the value and representation of each parameter are not limited to those in the above-described example. Furthermore, among each box of cimg 603, camp 604, fimg 605, bimg 606, fmdl 607, and bmdl 608 shown in FIG. 6, at least one may be stored in the moov box 602.

(Virtual Viewpoint Image Generation Apparatus)

Figure 13A:
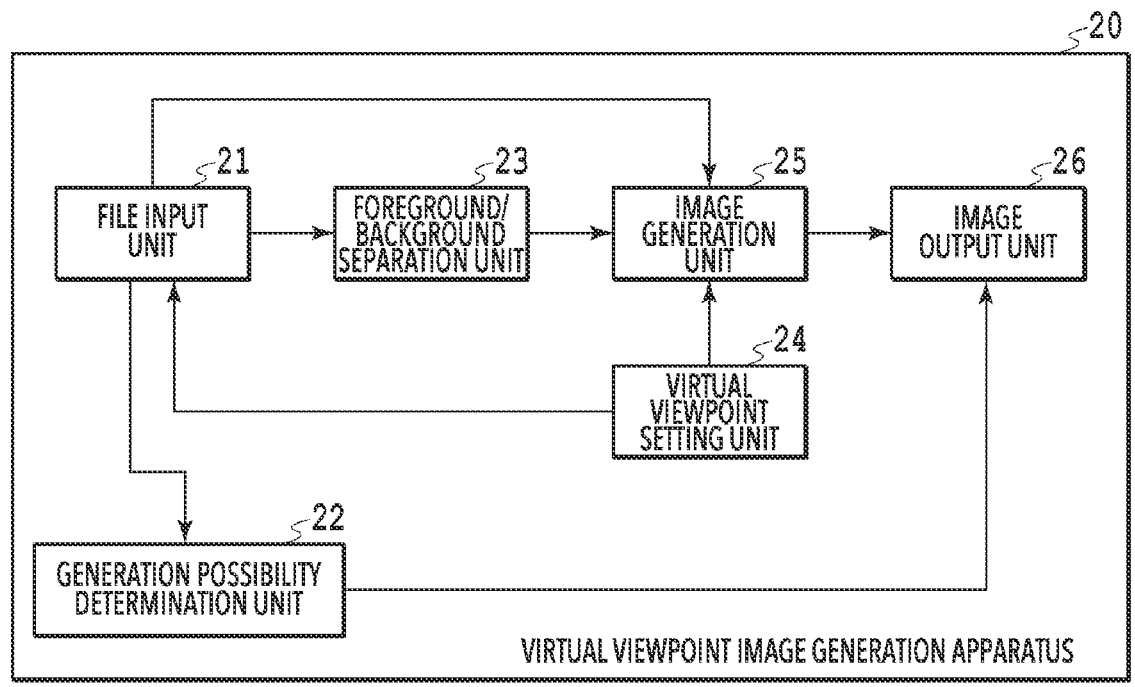
FIG. 13A is a function block diagram of a virtual viewpoint image generation apparatus according to the first embodiment and FIG. 13B is a block diagram showing an internal configuration of an image generation unit.

Following the above, the virtual viewpoint image generation apparatus that generates a video image viewed from a virtual viewpoint by using the Vvvm file 300 having the data structure shown in FIG. 3A, is explained. FIG. 13A is a function block diagram showing the internal configuration of the virtual viewpoint image generation apparatus 20 according to the present embodiment. The virtual viewpoint image generation apparatus 20 includes a file input unit 21, a generation possibility determination unit 22, a foreground/background separation unit 23, a virtual viewpoint setting unit 24, an image generation unit 25, and an image output unit 26. The virtual viewpoint image generation apparatus 20 is an information processing apparatus comprising hardware for calculation and data storage, such as a CPU, a RAM, a ROM, and an HDD, and is, for example, a PC. The function of each unit shown in FIG. 13A is implemented by the CPU reading a predetermined program from the ROM or the HDD and loading the program onto the RAM and executing the program. In the following, the role of each unit shown in FIG. 13A is explained.

The file input unit 21 receives an input of the Vvvm file 300 generated by the file generation apparatus 10, reads data necessary for each piece of processing, and delivers the data to the function block corresponding to each piece of processing. For example, the file input unit 21 reads the stored data information 302 and sends it to the generation possibility determination unit 22. Further, the file input unit 21 reads the camera parameter 303 of each camera and sends it to the foreground/background separation unit 23 and the image generation unit 25. Further, the file input unit 21 reads the background 3D model 304 and sends it to the image generation unit 25. Further, the file input unit 21 reads the frame data 305 at the time corresponding to the set virtual viewpoint based on the information on the virtual viewpoint path received from the virtual viewpoint selling unit 24 and sends it to the foreground/background separation unit 23.

The generation possibility determination unit 22 determines Whether it is possible to generate a virtual viewpoint image by the material data within the Vvvm file 300 by referring to the stored data information 302 received from the file input unit 21. That is, in a case where the material data specified by the stored data information meets the material data required in accordance with the function of the own apparatus, the generation possibility determination unit 22 determines that it is possible to generate a virtual viewpoint image. There are some methods of generating a virtual viewpoint image, but it is possible for the virtual viewpoint image generation apparatus 20 to generate a virtual viewpoint image based on model-based rendering by using, for example, the four pieces of the material data, that is, the foreground image, the background image, the foreground 3D model, and the background 3D image. Here, it is assumed that the material data stored in the Vvvm file 300 of the present embodiment is the three kinds of material data, that is, the image (multi-viewpoint image) captured by each camera, the camera parameters, and the background 3D model. In this example, in a case where the virtual viewpoint image generation apparatus 20 has the function to separate the foreground and the background from the captured image of each camera and further, the function to generate the foreground 3D model, it is possible to generate a virtual viewpoint image. The generation possibility determination unit 22 creates and stores in advance the determination criterion (determination table and the like indicating necessary material data) of the possibility of generation in view of the various functions of the own apparatus for generating a virtual viewpoint image by premising the generation method of a virtual viewpoint image, which is adopted by the own apparatus. Then, by checking whether or not the material data indicated by the determination criterion is included in the Vvvm file 300 by using the stored data information 302, the generation possibility determination unit 22 determines whether it is possible to generate a virtual viewpoint image. In the following, as an example of the determination criterion of the possibility of generation, variations A to C are shown.

|  | Foreground/ background separation function | Foreground 3D model generation function | Necessary material data |
| --- | --- | --- | --- |
| Determination criterion A | existent | existent | multi-viewpoint image camera parameter background 3D model |
| Determination criterion B | nonexistent | existent | foreground image background image camera parameter background 3D model |
| Determination criterion C | nonexistent | nonexistent | foreground image background image foreground 3D model background 3D model |

The determination results obtained by referring to the above-described determination criterion by using the stored data information 302 are reported to a user by displaying or the like the results on a monitor, not shown schematically, comprised by the virtual viewpoint image generation apparatus 20 via the image output unit 26.

The foreground/background separation unit 23 generates a foreground silhouette image by separating the captured image of each camera into a foreground and a background. For example, first, the foreground/background separation unit 23 generates a background image by using captured images corresponding to a plurality of frames for each camera. Specifically, the foreground background separation unit 23 detects an area in which there is movement and an area in which there is no movement by comparing images between a plurality of frames captured by the same camera and takes the area in which there is no movement as a background image. Upon obtaining the background image, next, the foreground/background separation unit 23 compares corresponding pixels between the captured image of each camera and the generated background image and takes the pixel whose difference of the pixel value is larger than or equal to a predetermined threshold value as a foreground pixel. Due to this, a foreground silhouette image is obtained, whose image size is the same as that of the captured image of each camera and in which the pixel whose pixel value is "1" is taken as the foreground pixel and the pixel whose pixel value is "0" is taken as the background pixel. The background image and the foreground silhouette image, both thus obtained, are sent to the video image generation unit 25. The method of separating the captured image into the foreground and the background is not limited to the above-described example. For example, it may also be possible to generate a foreground silhouette image by separating the foreground portion by using the machine learning technique or the like in the processing to generate the foreground 3D model from the captured image.

The virtual viewpoint setting unit 24 sets a virtual viewpoint based on user specification via a UI or the like, not shown schematically, or by reading setting information on the virtual viewpoint determined in advance. The virtual viewpoint that is set in a case of generating a virtual viewpoint image by a moving image is set frequently so as to move in the generation-target time (for example, in a case where a multi-viewpoint image is captured at 60 fps for ten seconds, time corresponding to 600 frames). Information on a movement path (in the following, called "virtual viewpoint path") of a virtual viewpoint such as this, which is set based on user specification or the like, is sent to the file input unit 21 and the image generation unit 25. The parameter that is set as the virtual viewpoint is, for example, the position, the orientation, the viewing angle or the like of the virtual camera and may further include the focal position, the aperture value and the like.

The image generation unit 25 generates a virtual viewpoint image based on the information on the virtual viewpoint path received from the virtual viewpoint setting unit 24. Details of the image generation unit 25 will be described later. The data of the virtual viewpoint image generated by the image generation unit 25 is sent to the image output unit 26.

The image output unit 26 outputs the data of the virtual viewpoint image received from the image generation unit 25 by displaying it on a monitor, not shown schematically, transmitting it to an external apparatus, and so on.

(Details of Image Generation Unit)

Figure 13B:
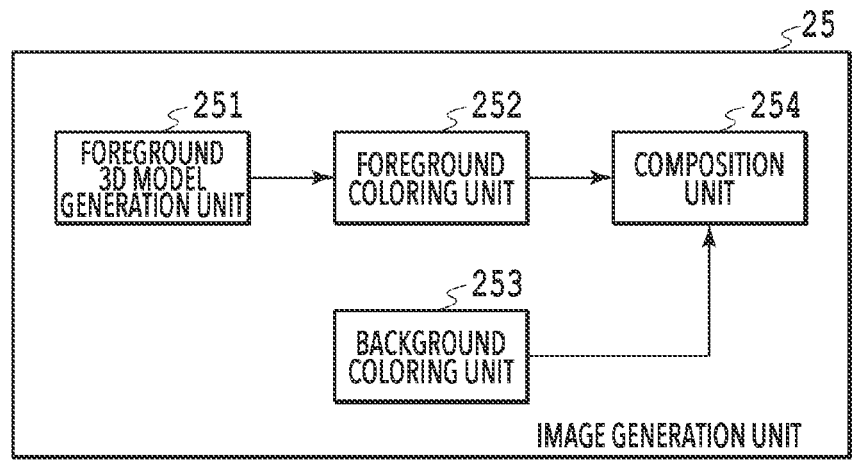

FIG. 13B is a function block diagram showing details of the image generation unit 25 according to the present embodiment. The image generation unit 25 of the present embodiment includes a foreground 3D model generation unit 251, a foreground coloring unit 252, a background coloring unit 253, and a composition unit 254. In the following, each unit is explained.

The foreground 3D model generation unit 251 generates a foreground 3D model based on the foreground silhouette image generated by the foreground/background separation unit 23 described previously and the camera parameters received from the file input unit 21. For example, a generation procedure of a foreground 3D model by the visual hull is as 1) to 3) below.

1) The foreground 3D model generation-target space that is set in advance is tiled with cuboids (voxels) having a predetermined volume. The generation-target space is determined by calculating the range that is viewed from the virtual camera based on the virtual viewpoint path.

2) By using the camera parameters of each camera, each cuboid is projected three-dimensionally onto the foreground silhouette image of the camera and whether the projected cuboid overlaps the foreground pixel is checked. In a case where the cuboid does not overlap the foreground pixel, the cuboid is determined not to be the cuboid forming the foreground 3D model. In a case where a cuboid is determined not to be the cuboid forming the foreground 3D model even for one camera of all the cameras, the cuboid is deleted.

3) The processing in 2) described above is performed for all the cuboids and a set of points having centroid coordinates of the remaining cuboids is taken as a foreground 3D model.

Here, the generation method of a foreground 3D model using the visual hull is explained, but the generation method of a 3D model is not limited to this. The foreground 3D model generated as described above is sent to the foreground coloring unit 252.

The foreground coloring unit 252 generates a foreground colored image by performing coloring processing for the foreground 3D model generated by the foreground 3D model generation unit 251 based on the virtual viewpoint path received from the virtual viewpoint setting unit 24. A specific procedure of coloring processing is as 1) to 3) below.

1) Determination of from which camera each point on the surface of the foreground 3D model is viewed (visibility determination) is performed. In this visibility determination, first, each point is projected onto the foreground silhouette images of all the cameras. At this time, in a case where a plurality of points is projected onto the same pixel on the foreground silhouette image, the point located at the position whose distance to the camera is the shortest is determined to be the point that is viewed and the other points are determined to be the point that is not viewed. By performing this processing for all the points on the surface of the foreground 3D model, the camera for coloring each point is specified.

2) Based on the virtual viewpoint path, the foreground 3D model is projected onto the image, that is the virtual viewpoint image, and the point that overlaps each pixel is specified.

3) For each pixel, by using the captured image of the camera for which it is determined that the projected point is viewed by the visibility determination, the color of the pixel onto which the point is projected is determined. At this time, in a case of a point that is viewed from a plurality of cameras, it is sufficient to determine the color by comparing the orientation of the virtual viewpoint and the orientation of each camera, appropriately weighting the captured images of two cameras whose angle therebetween is smaller, and so on.

The data of the foreground colored image generated as described above is sent to the composition unit 254.

The background coloring unit 253 generates a background texture that is attached onto the background 3D model by using the background image extracted from the captured image of each camera. Specifically, a background texture is generated by a procedure as 1) to 5) below.

1) in the background 3D model, a representative vertex is set.

2) The vertex set in 1) described above is projected onto the image, that is the virtual viewpoint image, by using the camera parameters of two cameras (camera 1, camera 2) close to the virtual viewpoint.

3) By using the corresponding point between the virtual viewpoint and the camera 1 and the corresponding point between the virtual viewpoint and the camera 2, a projection matrix 1 between the virtual viewpoint and the camera 1 and a projection matrix 2 between the virtual viewpoint and the camera 2 are calculated.

4) The coordinates of each pixel in the image, that is the virtual viewpoint image, are projected onto the background image of the camera 1 and the background image of the camera 2, respectively, by using the projection matrix 1 and the projection matrix 2 and the pixel values at the positions onto which the coordinates are projected are acquired, respectively.

5) The average value of the two obtained pixel values is taken as the pixel value of the background area in the image, which is the virtual viewpoint image.

Further, the background coloring unit 253 generates a background image (virtual background image) in a case of being viewed from the virtual viewpoint by attaching the generated background texture onto the background 3D model stored within the Vvvm file. The data of the virtual background image generated as described above is sent to the composition unit 254.

The composition unit 254 composites the foreground colored image received from the foreground coloring unit 252 and the virtual background image received form the background coloring unit 253 and generates an image representing the appearance from the virtual viewpoint. Specifically, the composition unit 254 performs processing to overwrite each pixel of the foreground colored image by the pixel value of the corresponding pixel in the virtual background image.

Figure 14:
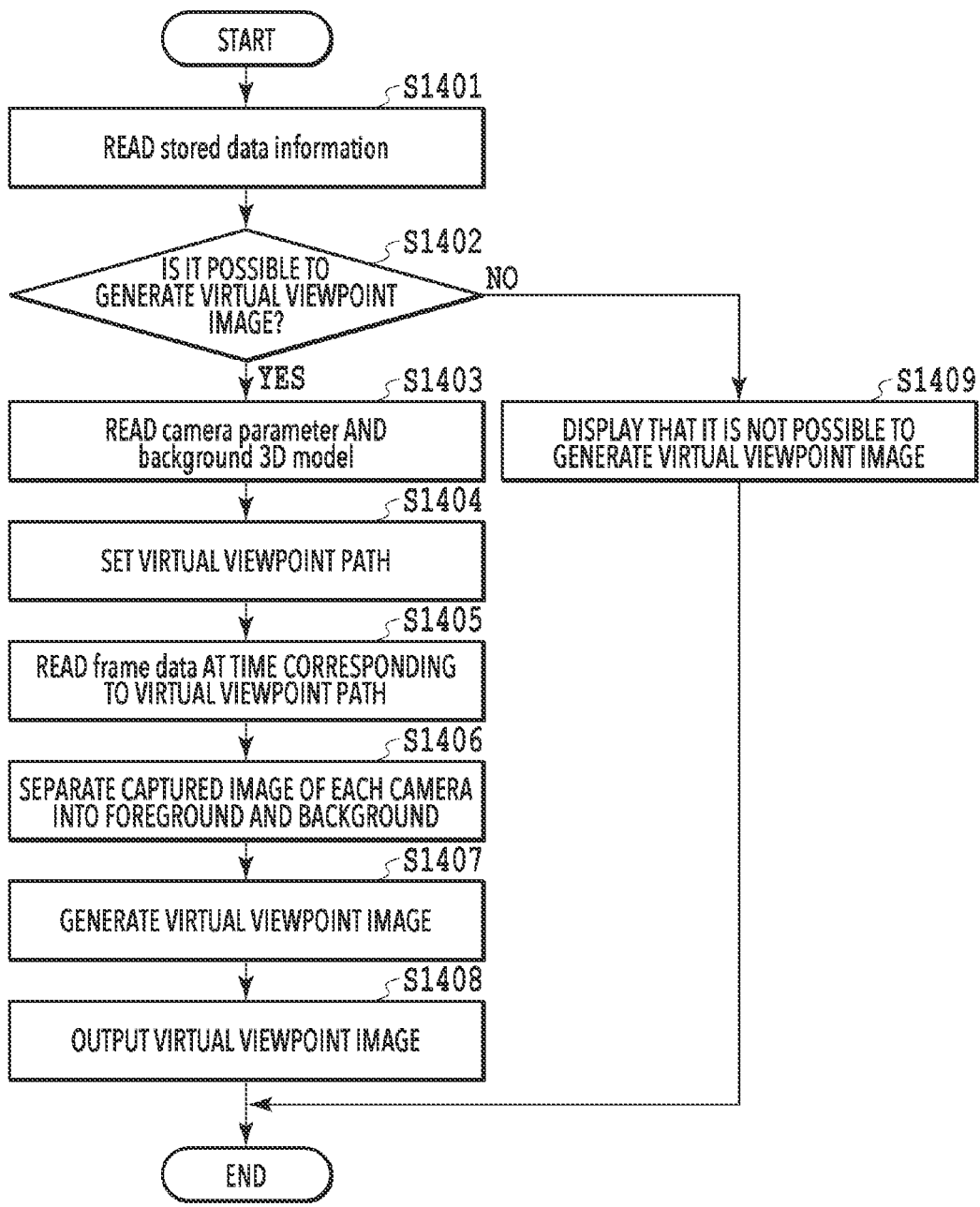
FIG. 14 is a flowchart showing a flow of processing to generate a virtual viewpoint image from a Vvvm file according to the first embodiment.

FIG. 14 is a flowchart showing a flow of the processing front generation of a virtual viewpoint image from the Vvvm file 300 by the virtual viewpoint image generation apparatus 20 until outputting of the virtual viewpoint image according to the present embodiment. Symbol "S" at the top of each piece of processing means a step. In the following, along the flow in FIG. 14, explanation is given.

At S1401, the file input unit 21 reads the stored data information 302 from the Vvvm file 300 and outputs the stored data information 302 to the generation possibility determination unit 22. At S1402 that follows, the generation possibility determination unit 22 determines whether it is possible to generate a virtual viewpoint image by using the material data stored within the Vvvm file 300 by reading the information on the determination criterion of the possibility of generation prepared in advance and referring to the stored data information 302. In a case where the determination results indicate that it is possible to generate a virtual viewpoint image, the processing advances to S1403. At this time, it may also be possible for the image output unit 26 to give a notification that it is possible to generate a virtual viewpoint image by displaying a message indicating that on a monitor, not shown schematically. On the other hand, in a case where it is not possible to generate a virtual viewpoint image, the processing advances to S1409.

At S1403, the file input unit 21 reads the camera parameter 303 and the background 3D model 304 from the Vvvm file 300 and outputs the camera parameter 303 to the foreground/background separation unit 23 and the background 3D model 304 to the image generation unit 25, respectively. At S1404 that follows, the virtual viewpoint setting unit 24 sets the virtual viewpoint path based on user specification or the like and outputs the information to the file input unit 21 and the image generation unit 25.

At S1405, the file input unit 21 reads the frame data 305 corresponding to the input virtual viewpoint path from the Vvvm file 300 and outputs the frame data 305 to the foreground/background separation unit 23. Subsequent S1406 and S1407 are performed for each frame.

At S1406, the foreground/background separation unit 23 performs the foreground/background separation processing for the captured image of each camera and generates the foreground silhouette image and the background image and outputs them to the image generation unit 25. At S1407 that follows, the image generation unit 25 generates a virtual viewpoint image based on the virtual viewpoint path, the foreground silhouette image, and the background, which are input.

At S1408, the image output unit 26 outputs the data of the virtual viewpoint image generated at S1408. Further, at S1409, the image output unit 26 gives a notification, such as displaying a message to the effect that it is not possible to output a virtual viewpoint image on a monitor, not shown schematically.

The above is the flow of the processing from the generation of a virtual viewpoint image from the Vvvm file 300 until outputting thereof.

<Variations of Vvvm File>

The data structure of a Vvvm file that files material data in a common format is not limited to the example shown in FIG. 3A described previously. In the following variations of the data structure of a Vvvm file are shown.

Figure 15:
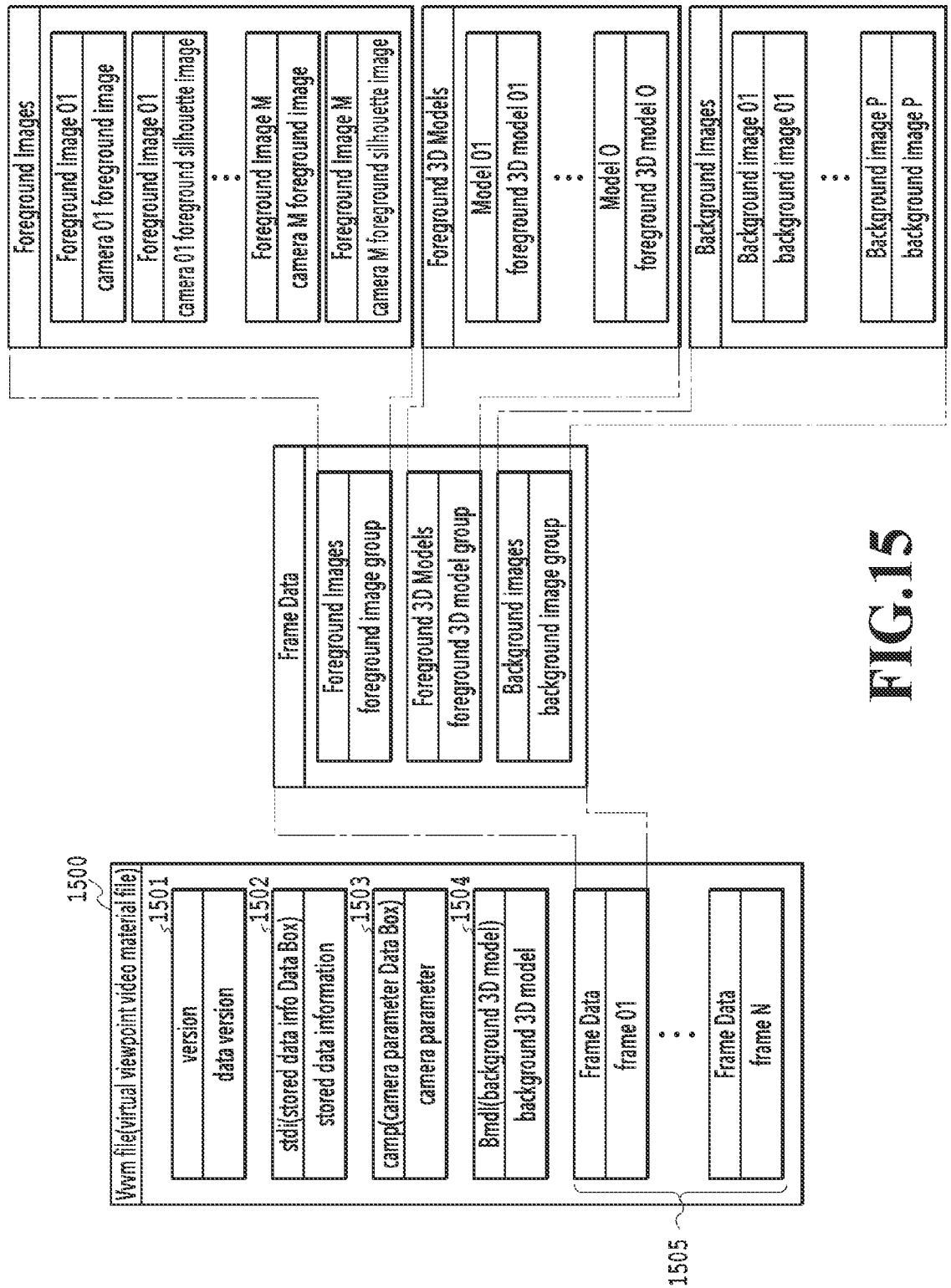
FIG. 15 is a diagram showing a variation of a data structure of a Vvvm file.

A Vvvm file 1500 shown in FIG. 15 includes data version 1501, stored data information 1502, camera parameter 1503, background 3D model 1504, and frame data 1505. Then, in the frame data 1505, first frame to Nth frame exist and in one frame data, foreground image group, foreground 3D model group, and background image group are included. Then, in the foreground image group, foreground images and foreground silhouette images corresponding to M cameras are included. Further, in the foreground 3D module group, O foreground 3D models are included. Furthermore, in the background image group, P background images are included. In this case, any of N, M, O, and P is a natural number not less than 1. What kind of material data is stored in the Vvvm 1500 is indicated by the stored data information 1502. Then, FIG. 16A shows an example of metadata relating to the foreground image and FIG. 16B shows bit assignment thereof. Here, foreground trimming image means an image obtained by trimming a foreground area from the captured image of the camera and corresponds to an extended profile in a case where the foreground image is taken as a main profile. In a case where only the foreground trimming image is stored in the Vvvm file and foreground image itself is not stored, this means that it is not possible to generate a virtual viewpoint image unless the side of the virtual viewpoint image generation apparatus is compatible with the foreground trimming image. For example, in a case of an apparatus compatible with a main profile of a certain version but not compatible with an extended profile, it is possible to determine that it is not possible for the own apparatus to generate a virtual viewpoint image by checking metadata relating to the foreground image. As described above, by the metadata that is attached to the material data, it is made possible to determine the possibility of generation of a virtual viewpoint image in more detail. FIG. 16C shows an example of metadata relating to the background image and FIG. 16D shows bit assignment of the stored background image. Then, FIG. 16E shows an example of metadata of the foreground 3D model and FIG. 16F shows bit assignment of the stored foreground 3D model. As the foreground 3D model and the background 3D model, there are some kinds of model, such as a point cloud model configured by a set of points and a mesh model configured by collecting the surfaces of polygons. It is possible for the apparatus that generates a virtual viewpoint image to determine whether the kind of the foreground/background 3D model stored in the Vvvm file is the kind with which the own apparatus is compatible by referring to the metadata. An aspect in which the Vvvm file 1500 having the data structure shown in FIG. 15 is generated and a virtual viewpoint image is generated by using the Vvvm file 1500 is explained in the next second embodiment.

Figure 17:
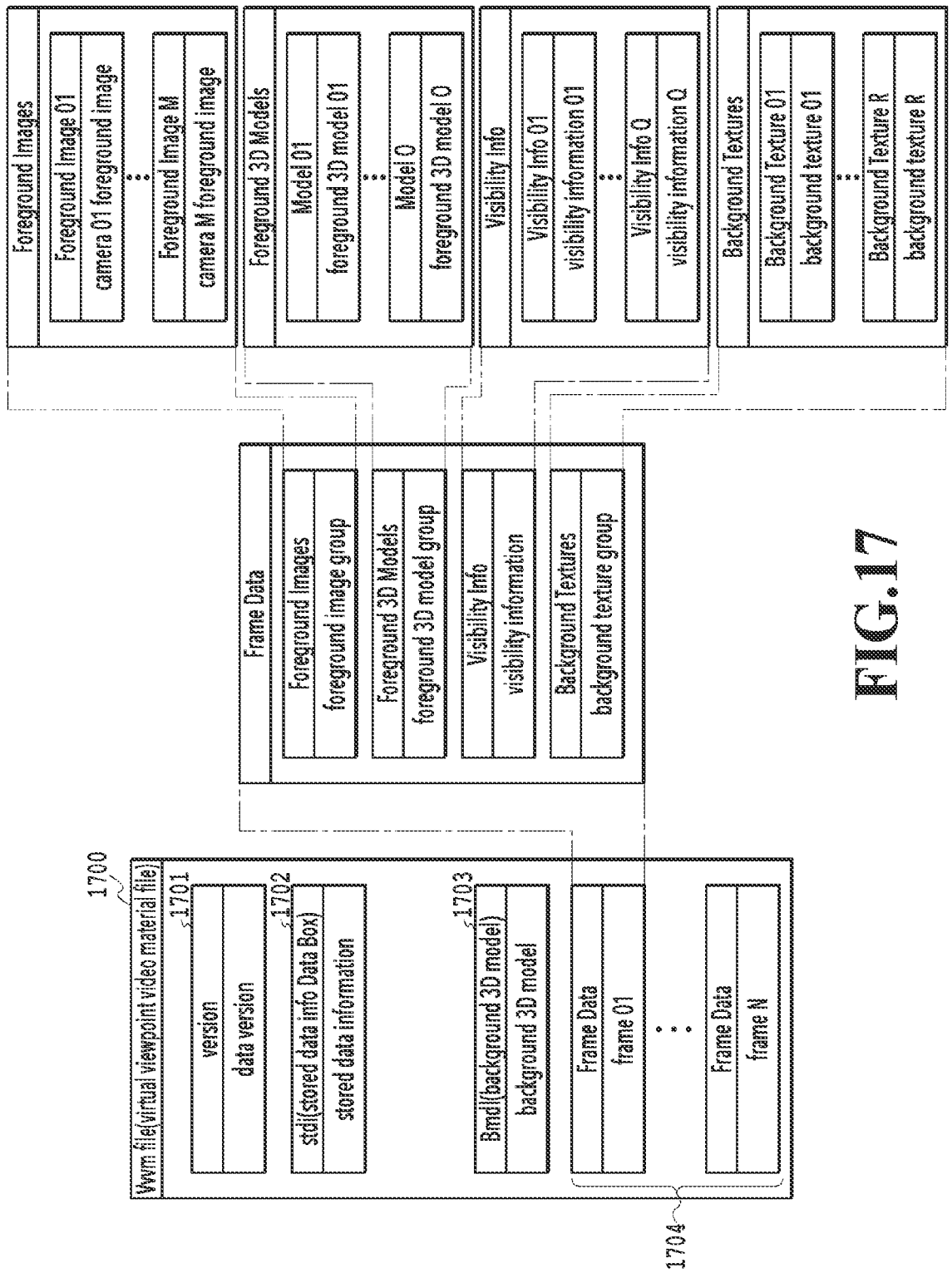
FIG. 17 is a diagram showing a variation of a data structure of a Vvvm file.

A Vvvm file 1700 shown in FIG. 17 includes data version 1701, stored data information 1702, background 3D model 1703, and frame data 1704. Then, in the frame data 1704, first frame to Nth frame exist and in one frame data, foreground image group, foreground 3D model group, visibility information, and background texture group are included. Here, the visibility information is information corresponding to the results of the visibility determination described previously. In the foreground image group, foreground images corresponding to M cameras are included. Further, in the foreground 3D model group, O foreground 3D models are included. Further, in the visibility information, Q pieces of visibility information are included. Further, in the background texture group, R background textures that are attached onto the background 3D models are included. Q and R here are also each a natural number not less than 1. Further, the R background textures are generated by compositing the background images, and therefore, R≤P holds. What kind of material data is stored in the Vvvm File 1700 is indicated by the stored data information 1702. Explanation of metadata and bit assignment is omitted. In a case of the Vvvm file 1700 shown in FIG. 17, in addition to the foreground 3D model, the visibility information and the data of the background texture are also included. Consequently, it is possible to omit the visibility determination in the foreground coloring unit 252 and the generation of a background texture in the background coloring unit 253, and therefore, it is possible to lighten the load on the side of the virtual viewpoint image generation apparatus.

Figure 18:
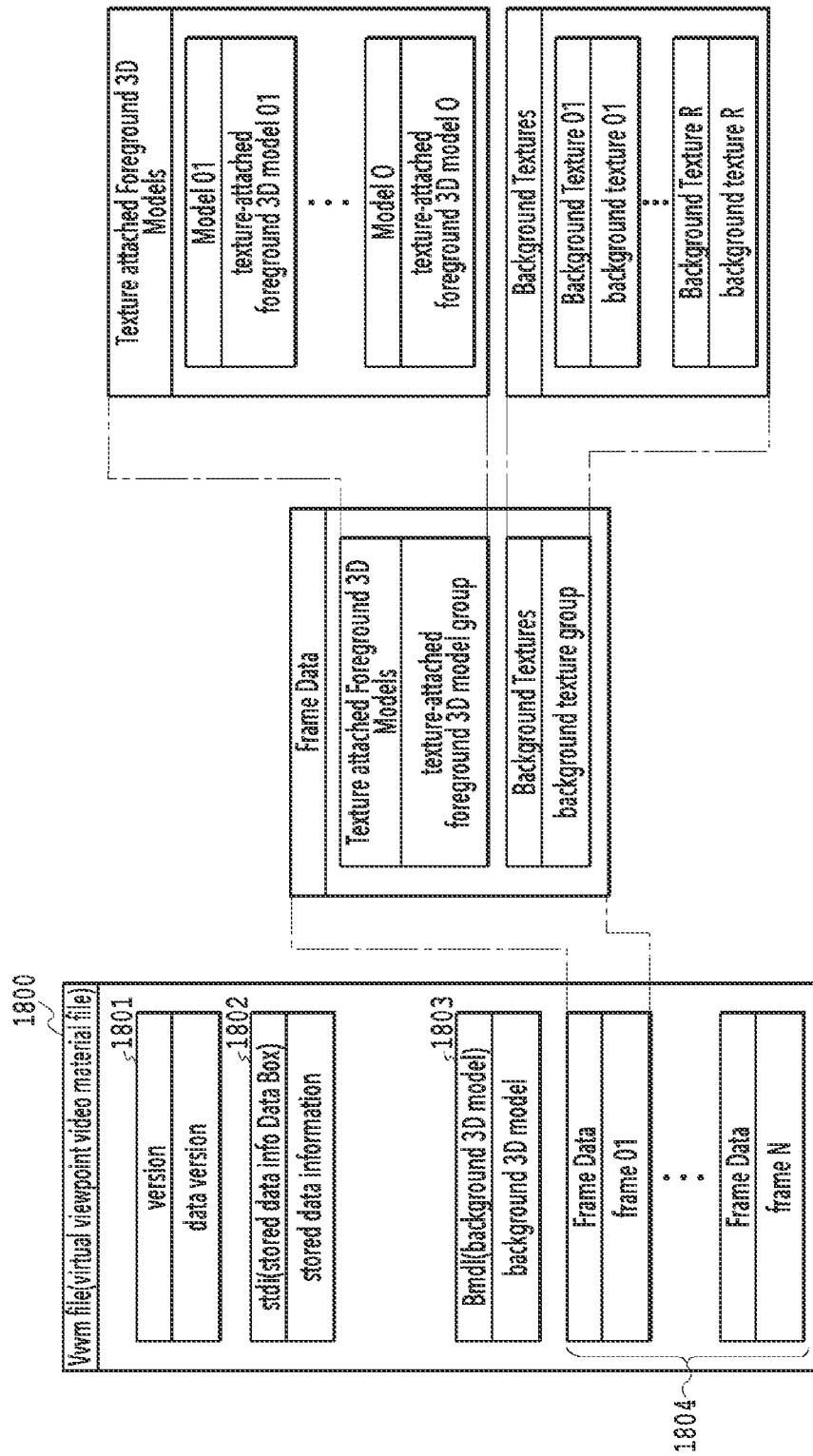
FIG. 18 is a diagram showing a variation of a data structure of a Vvvm file.

A Vvvm file 1800 shown in FIG. 18 includes data version 1801, stored data information 1802, background 3D model 1803, and frame data 1804. Then, in the frame data 1804, first frame to Nth frame exist and in one frame data, texture-attached foreground 3D model group and background texture group are included. Here, the texture-attached foreground 3D model means a foreground 3D model for which the foreground coloring processing described previously has been performed. In the texture-attached foreground 3D model group. O texture-attached foreground 3D models are included. Further, in the background texture group, R background textures are included. Then, what kind of material data is stored in the Vvvm file 1800 is indicated by the stored data information 1802. Explanation of metadata and bit assignment is omitted. In a case of the Vvvm file 1800 shown in FIG. 18, the foreground 3D model for which the coloring processing has already been performed is included, and therefore, it is possible to further lighten the load on the side of the virtual viewpoint image generation apparatus compared to that in a case of the Vvvm file 1700 shown in FIG. 17.

Normally, the image data (captured image of each camera, foreground image, background image) configuring the frame data in FIG. 3A, FIG. 15, and FIG. 17 is stored in order of consecutive numbers attached to the cameras, but this is not limited. For example, it may also be possible to attach a camera number to the header of each piece of material data and store the data in random order. Further, in the present embodiment, the data of the captured image of each camera, the foreground image and the like is stored so that it is possible to read the data for each frame, but it may also be possible to store the data so that it is possible to read the data for each camera.

Furthermore, in the data structure illustrated in FIG. 3A, FIG. 15, FIG. 17, and FIG. 18, the background 3D model is included in any Vvvm file, but this is not indispensable. For example, in a case where the image capturing scene is the same kind of event that is performed in the same facility, such as a soccer game at the XX stadium, it is possible to use the background 3D model prepared in advance repeatedly in a sharing manner. Even in a case where the background 3D model is not included in the received Vvvm file, it may also be possible for the virtual viewpoint image generation apparatus to generate a virtual viewpoint image by, for example, acquiring the data of the background 3D model corresponding to the image capturing scene from another information processing apparatus. At this time, it is needless to say that the determination criterion of the possibility of generation will be one in accordance with that case.

As above, according to the present embodiment, material data necessary for generating a virtual viewpoint image is filed in the common format en bloc. Due to this, it is made possible for any terminal or application compatible with the Vvvm file in the common format to easily generate a virtual viewpoint image, and therefore, the utilization environment of a virtual viewpoint image is extended.

Second Embodiment

Next, an aspect is explained as the second embodiment in which the Vvvm file 1500 having the data structure shown in FIG. 15 described previously is generated and a virtual viewpoint image is generated by using the Vvvm file 1500. Explanation of the contents in common to those of the first embodiment is omitted or simplified and in the following, different points are explained mainly.

As described previously, the Vvvm file 1500 shown FIG. 15 includes the data version 1501, the stored data information 1502, the camera parameter 1503, the background 3D model 1504, and the frame data 1505. Consequently, the file generation apparatus according to the present embodiment performs the foreground/background separation, generates the foreground 3D model, and stores each piece of data of the foreground image, the foreground silhouette image, the foreground 3D model, and the background image for each frame. Then, to the limn file 1500, the stored data information 1502 indicating that these pieces of material data are stored is attached. Further, in a case where it is possible to generate a virtual viewpoint image by referring the stored data information 1502 and determining the possibility of generation, the virtual viewpoint image generation apparatus according to the present embodiment generates a virtual viewpoint image by using each piece of material data of the foreground image, the background image, and the foreground 3D model within the file.

(File Generation Apparatus)

Figure 19:
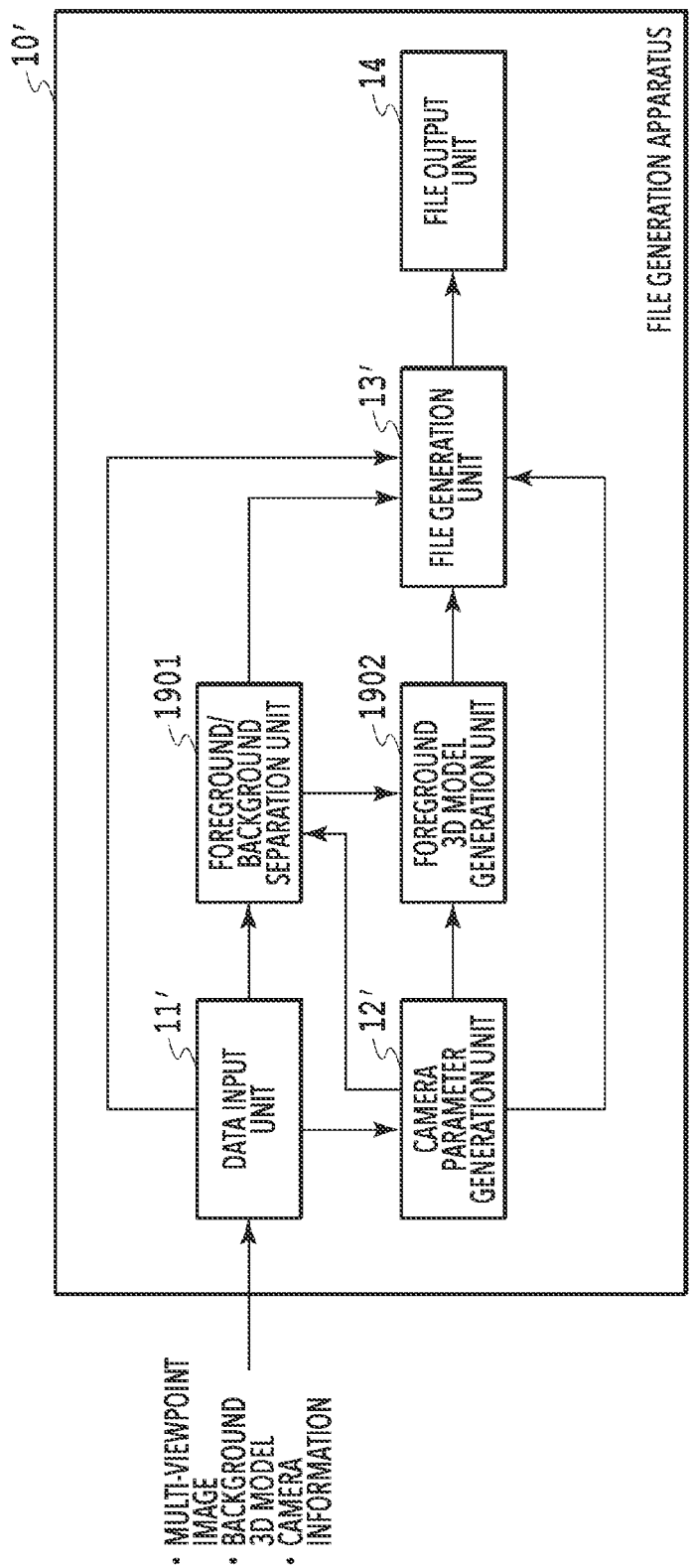
FIG. 19 is a function block diagram of a file generation apparatus according to a second embodiment.

FIG. 19 is a diagram corresponding to FIG. 1 of the first embodiment and a function block diagram of a file generation apparatus 10' according to the present embodiment. The file generation apparatus 10' has a foreground/background separation unit 1901 and a foreground 3D model generation unit 1902, in addition to a data input unit 11', a camera parameter generation unit 12', a file generation unit 13' and the file output unit 14. In the following, the role of each unit shown in FIG. 19 is explained.

The function of the data input unit 11' is the same as that of the data input unit 11 of the first embodiment, but the output destination of the input data is different. That is, upon receipt of inputs of camera information, multi-viewpoint image, and background 3D model, the camera information is sent to the camera parameter generation unit 12', the background 3D model is sent to the file generation unit 13', and the data of the multi-viewpoint image is sent to the foreground/background separation unit 1901, respectively.

The function of the camera parameter generation unit 12' is also the same as that of the camera parameter generation unit 12 of the first embodiment, but the output destination of the generated parameter is different. In a case of the present embodiment, the generated camera parameter is sent to the foreground/background separation unit 1901, the foreground 3D model generation unit 1902, and the file generation unit 13'.

The foreground/background separation unit 1901 performs processing to separate the captured image of each camera into the foreground and the background and generates a foreground image, a foreground silhouette image, and a background image, like the foreground/background separation unit 23 in the virtual viewpoint image generation apparatus 20 of the first embodiment. Then, the foreground/background separation unit 1901 sends the obtained foreground silhouette image to the foreground 3D model generation unit 1902 and the foreground image and the background image to the file generation unit 13', respectively.

The foreground 3D model generation unit 1902 generates a foreground 3D model based on the foreground silhouette image and the virtual viewpoint path, like the foreground 3D model generation unit 251 in the image generation unit 25 of the virtual viewpoint image generation apparatus 20 of the first embodiment. Then, the foreground 3D model generation unit 1902 sends the obtained foreground 3D model to the file generation unit 13'.

The file generation unit 13' acquires the background 3D model from the data input unit 11', the foreground image, the foreground silhouette image, and the background image from the foreground/background separation unit 1901, the foreground 3D model from the foreground 3D model generation unit 1902, and the camera parameter from the camera parameter generation unit 12'. Then, the file generation unit 13' files these acquired pieces of data in the common format. At this time, the foreground image, the foreground silhouette image, the foreground 3D image, and the background image are stored for each frame. Further, the foreground image and the foreground silhouette image are stored so that it is possible to identify them for each camera and the foreground image 3D model is stored so that it is possible to identify it for each model, respectively. Furthermore, the stored data information 1502 indicating that these are stored as the material data is attached and thus the Vvvm file 1500 shown in FIG. 15 is generated.

(Virtual Viewpoint Image Generation Apparatus)

Figure 20A:
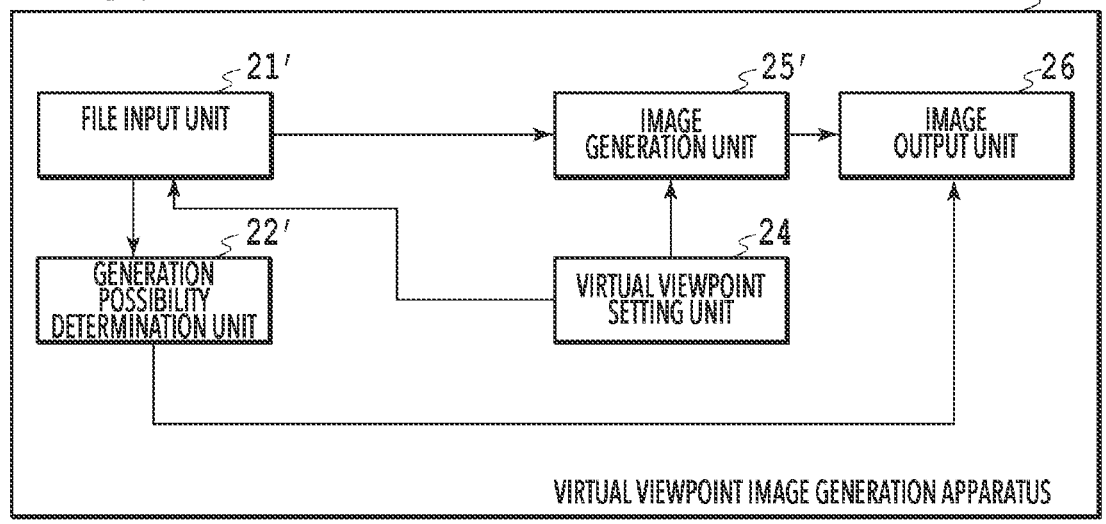
FIG. 20A is a function block diagram of a virtual viewpoint image generation apparatus according to the second embodiment.
Figure 20B:
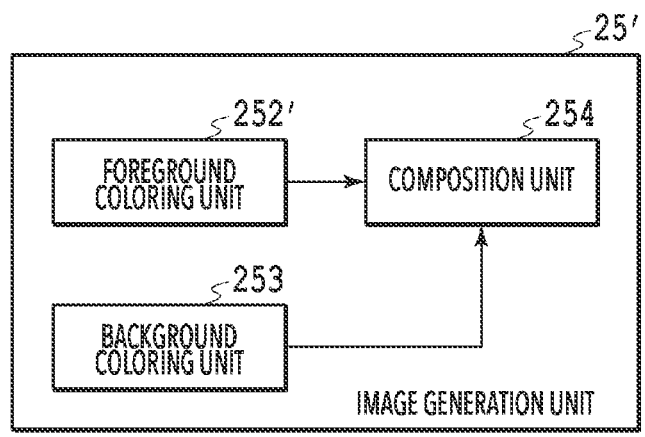
FIG. 20B is a block diagram showing an internal configuration of an image generation unit and FIG. 20C is a block diagram showing an internal configuration of a foreground coloring unit.

FIG. 20A and FIG. 20B are diagrams corresponding to FIG. 13A and FIG. 13B of the first embodiment and show the internal configuration of a virtual viewpoint image generation apparatus 20' and an image generation unit 25', respectively, according to the present embodiment. In FIG. 20A, a processing block corresponding to the foreground/background separation unit 23 does not exist and in FIG. 20B, a processing block corresponding to the foreground 3D generation unit 251 does not exist. In the following, the function of each unit shown in FIG. 20A and FIG. 20B is explained.

A file input unit 21' receives an input of the Vvvm file generated in the file generation apparatus 10' and reads data necessary for each piece of processing and delivers the data to the block corresponding to each piece of processing. In a case where the Vvvm file 1500 shown in FIG. 15 is input, the file input unit 21' reads the stored data info 1502 and sends it to a generation possibility determination unit 22'. Further, the file input unit 21' reads the camera parameter 1503 and the background 3D model 1504 and sends them to the image generation unit 25'. Furthermore, the file input unit 21' reads the frame data 1505 corresponding to the set virtual viewpoint path based on the information on the virtual viewpoint path received from the virtual viewpoint setting unit 24 and sends it to the image generation unit 25'.

The generation possibility determination unit 22' determines whether it is possible to generate a virtual viewpoint image based on the input Vvvm file by using the stored data information received from the file input unit 21'. As described previously, the virtual viewpoint image generation apparatus 20' of the present embodiment has neither the foreground/background separation function nor the foreground 3D model generation function. Consequently, in a case where the input Vvvm file is the Vvvm file 1500 shown in FIG. 15A, it is determined that generation is possible, but for example, in a case where the input Vvvm file is the Vvvm file 300 shown in FIG. 3A, it is determined that generation is not possible.

The image generation unit 25' generates a virtual viewpoint image based on the information on the virtual viewpoint path received from the virtual viewpoint setting unit 24. Details of the image generation unit 25' will be described later. Then, the image output unit 26 outputs the data of the virtual viewpoint image generated by the image generation unit 25' by displaying it on a monitor, not shown schematically, transmitting it to an external terminal or the like, and so on.

(Details of Image Generation Unit)

Figure 20C:
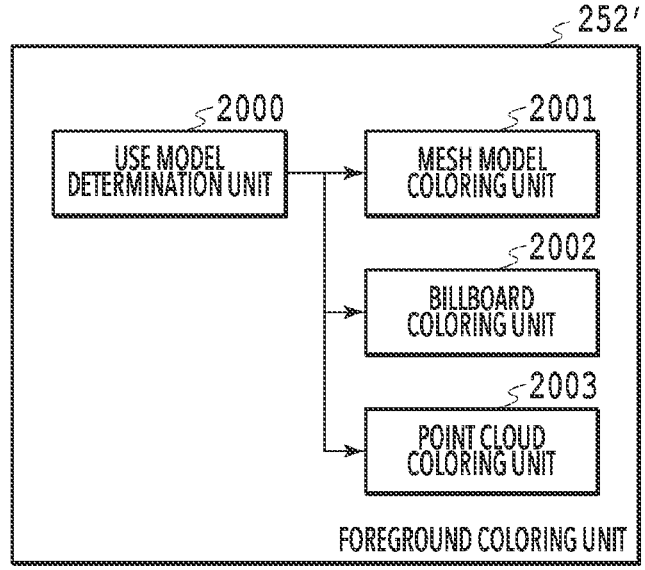

As shown in FIG. 20B, the image generation unit 25' of the present embodiment includes a foreground coloring unit 252', the background coloring unit 253, and the composition unit 254. The background coloring unit 253 and the composition unit 254 do not in the least differ from those of the first embodiment. FIG. 20C is a block diagram showing the internal configuration of the foreground coloring unit 252' according to the present embodiment. The foreground coloring unit 252' includes a use model determination unit 2000, a coloring unit corresponding to a plurality of kinds of foreground 3D model, specifically, a mesh model coloring unit 2001, a billboard coloring unit 2002, and a point cloud coloring unit 2003. In the coloring unit determined by the use model determination unit 2000, the 3D model of the foreground object is colored and a foreground colored image viewed from the virtual viewpoint is generated. For example, in a case where the type of the input foreground 3D model is the billboard format, the billboard coloring unit 2002 is determined as the coloring unit that is applied to the foreground 3D model. In a case of the billboard, only the coordinates position at which the billboard is placed is shown (not having the three-dimensional shape of the object), and therefore, the foreground viewed from the virtual viewpoint is generated by calculating the direction and the size viewed from the virtual viewpoint in a case where there is a drawing-target object at the specified coordinates position.

The use model determination unit 2000 specifies the kind of foreground 3D model included in the frame data 1505 based on the metadata attached to the foreground 3D model and determines which of the three coloring units 2001 to 2003 to use to perform coloring processing. At this time, in a case where a plurality of kinds of foreground 3D model is stored within the frame data 1505, the coloring unit that is used is determined in order of priority determined in advance (for example, in order of the point cloud coloring unit 2003, the mesh model coloring unit 2001, and the billboard coloring unit 2002). Further, in a case where a user specifies a virtual viewpoint image generation mode at the time of setting a virtual viewpoint, it may also be possible to determine the coloring unit in accordance with the contents of the generation mode relating to the specification. For example, in a case where a high image quality mode is specified, the point cloud coloring unit 2003 is determined, in a case where a normal image quality mode is specified, the mesh model coloring unit 2001 is determined, in a case where a high-speed mode is specified, the billboard coloring unit 2002 is determined, and so on, By determining the processing unit that is used for the coloring processing for the foreground 3D model based on the criterion determined in advance as described above, it is possible to generate an appropriate foreground in accordance with the purpose and the use.

Here, for example, it is assumed that the foreground coloring unit 252' does not have the point cloud coloring unit 2003 and the foreground 3D model stored in the frame data 1505 of the Vvvm file 1500 that is input to the virtual viewpoint image generation apparatus 20' is only the point cloud model. In this case, the generation possibility determination unit 22' specifies that the foreground 3D model included in the frame data 1505 is only the point cloud model by referring to the metadata relating to the foreground 3D model. Then, the generation possibility determination unit 22' determines that it is not possible to generate a virtual viewpoint image because of the own apparatus not having the coloring unit corresponding to the point cloud model. As described above, by checking the contents of the metadata attached to each piece of material data, not only the stored data information 1502, it is made possible to determine the possibility of generation of a virtual viewpoint image in more detail.

Modification Example

It may also be possible for the image generation unit 25' to generate a virtual viewpoint image more efficiently by acquiring only the material data that is used actually under the set virtual viewpoint path from the Vvvm file 1500. That is, the file input unit 21' specifies only the material data that is used actually for generation of a virtual viewpoint image based on the information on the virtual viewpoint path that is input from the virtual viewpoint setting unit 24 and delivers the material data to the image generation unit 25'. At the time of this specification, the kinds of material (foreground image, foreground 3D model, background image) included in the target frame data 1505 are specified, and then, further detailed specification, such as the camera ID and the model ID, is caused to be included. In the following, how to specify the material data corresponding to the set virtual viewpoint is explained.

First, as regards the foreground image and the background image, the foreground image or the background image captured by the camera at the viewpoint position close to the set virtual viewpoint position is specified based on the camera parameters within the Vvvm file. At this time, on a condition that the number of selected foreground images is small, there is a case where coloring cannot be performed because of occlusion by an obstacle. Further, in a case where the number of selected background image is small, there is a possibility that it is not possible to color all the backgrounds viewed from the virtual viewpoint. Because of this, the foreground images and the background images in the captured images of a plurality of cameras (for example, six cameras in order from the camera closest to the viewpoint position) are selected. At this time, by increasing the number of cameras or mixing cameras whose heights are different, it is possible to make occlusion unlikely to affect, reduce the possibility that the background cannot be colored, and so on.

Next, the foreground 3D model is specified based on bounding box information on the foreground 3D model included in the Vvvm file. The bounding box information is information indicating three-dimensional coordinates of a cuboid in a case where the foreground 3D model is surrounded by the cuboid. By using this bounding box information, whether or not each foreground 3D model is viewed from the set virtual viewpoint is determined. Specifically, in a case where each vertex of the cuboid representing the bounding box is projected toward the two-dimensional image, which is the virtual viewpoint image, whether or not the point corresponding to each vertex exists on the image is determined. In this manner, the foreground 3D model that is viewed from the set virtual viewpoint is specified.

The above-described contents in which a virtual viewpoint image is generated efficiently by acquiring only the material data that is used actually under the set virtual viewpoint path are not limited to the Vvvm file having the data structure shown in FIG. 15. It is possible to apply the contents to a Vvvm file having any other data structures.

As above, in a case of the present embodiment, the file generation apparatus generates the Vvvm file including the foreground image, the background image, and the foreground 3D model as the material data. Consequently, in a virtual viewpoint image generation apparatus not having the foreground/background separation function or the foreground 3D model generation function, it is also possible to easily generate a virtual viewpoint image in a case of being compatible with a Vvvm file.

Other Embodiments

Embodiment(s) of the present disclosure can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An image generation apparatus comprising:
one or more memories storing instructions; and
one or more processors executing the instructions to:
input a file including material data used for generation of a virtual viewpoint image that is to be generated based on images captured from a plurality of viewpoints, type information for specifying a type of the material data, and data information specifying each item of the material data is included in the file, wherein each item of the material data is stored in a common format, each item of the material data being at least two or more items among a plurality of captured images obtained by using a plurality of imaging apparatuses, parameters of the plurality of imaging apparatuses, a foreground image of the plurality of captured images, a background image of the plurality of captured images, a foreground 3D model representing a three-dimensional shape of a foreground object and a background 3D model representing a three-dimensional shape of a background object;
determine, based on the data information, whether it is possible to generate the virtual viewpoint image where the material data included in the file meet the material data required for the generation; and
generate, in a case where it is determined that generation is possible, a virtual viewpoint image based on the material data included in the input file.

2. The image generation apparatus according to claim 1 wherein
in a case where the material data specified by the data information meets material data required in accordance with a function of the generation, a determination that it is possible to generate a virtual viewpoint image is performed.

3. The image generation apparatus according to claim 1 wherein
the one or more processors further execute the instructions to notify a user of results in the determination.

4. The image generation apparatus according to claim 1, wherein
the virtual viewpoint image is generated based on at least a function to color the foreground 3D model representing a three-dimensional shape of the foreground object in a captured image of each imaging apparatus.

5. The image generation apparatus according to claim 4, wherein a kind of the foreground 3D model is one of a 3D model represented by a point cloud, a 3D model represented by a mesh, and a 3D model in a billboard format, and the virtual viewpoint image is generated by determining a foreground 3D model that is used in accordance with a predetermined criterion in a case where a plurality of kinds of foreground 3D model is included in the file and using the determined foreground 3D model.

6. The image generation apparatus according to claim 5, wherein the predetermined criterion is priority determined in advance for the kind of foreground 3D model.

7. The image generation apparatus according to claim 5, wherein the predetermined criterion is a criterion that specifies which kind of the foreground 3D model is used in accordance with a generation mode of the virtual viewpoint image.

8. The image generation apparatus according to claim 4, wherein the foreground 3D model is generated by using a foreground silhouette image in a captured image of each imaging apparatus and parameters including at least a position and an orientation of each imaging apparatus, which are included in material data included in the file; and the virtual viewpoint image is generated by coloring for the generated foreground 3D model.

9. The image generation apparatus according to claim 4, wherein the virtual viewpoint image is generated by:

generating a foreground silhouette image by performing foreground/background separation for a captured image of each imaging apparatus, which is included in material data included in the file;

generating a foreground 3D model by using parameters including at least a position and an orientation of each of the imaging apparatus, which are included in the material data, and the generated foreground silhouette image; and generating the virtual viewpoint image by coloring for the generated foreground 3D model.

10. The image generation apparatus according to claim 1, wherein the virtual viewpoint image is generated by:

determining material data necessary for generation of the virtual viewpoint image based on a virtual viewpoint that is set;

acquiring the determined necessary material data from the file; and using the acquired material data.

* * * * *